US012579306B2

(12) United States Patent
Turner et al.

(10) Patent No.: US 12,579,306 B2
(45) Date of Patent: Mar. 17, 2026

(54) TECHNIQUES FOR MANAGING ACTIVITY LOGS IN A MANNER THAT PROMOTES USER PRIVACY

(71) Applicant: Apple Inc., Cupertino, CA (US)

(72) Inventors: Benjamin S. Turner, San Francisco, CA (US); Andreas I. Gal, Portola Valley, CA (US); Keith W. Rauenbuehler, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 152 days.

(21) Appl. No.: 18/513,304

(22) Filed: Nov. 17, 2023

(65) Prior Publication Data

US 2024/0403479 A1 Dec. 5, 2024

Related U.S. Application Data

(60) Provisional application No. 63/506,051, filed on Jun. 2, 2023.

(51) Int. Cl.
| | |
|---|---|
| *G06F 21/62* | (2013.01) |
| *H04L 9/06* | (2006.01) |
| *H04L 9/30* | (2006.01) |
| *H04L 9/32* | (2006.01) |

(52) U.S. Cl.
CPC ........ *G06F 21/6245* (2013.01); *H04L 9/0643* (2013.01); *H04L 9/30* (2013.01); *H04L 9/3297* (2013.01)

(58) Field of Classification Search
CPC ..... G06F 21/6245; H04L 9/0643; H04L 9/30; H04L 9/3297
See application file for complete search history.

(56) References Cited

U.S. PATENT DOCUMENTS

| | | | |
|---|---|---|---|
| 2016/0063607 A1* | 3/2016 | Knipfer | G06Q 30/0635 |
| | | | 705/26.81 |
| 2017/0075938 A1* | 3/2017 | Black | H04L 9/3239 |
| 2019/0347339 A1 | 11/2019 | Becker et al. | |

FOREIGN PATENT DOCUMENTS

WO 2014028524 A1 2/2014

OTHER PUBLICATIONS

PCT Patent Application No. PCT/US2024/028057—International Search Report and Written Opinion dated Jul. 30, 2024.

* cited by examiner

*Primary Examiner* — Malcolm Cribbs
(74) *Attorney, Agent, or Firm* — BAKERHOSTETLER; Kyle B. Morse

(57) ABSTRACT

Disclosed herein are techniques for managing activity logs in a manner that promotes user privacy. One technique can by implemented by a centralized management hub, and include the steps of (1) receiving, from a peripheral device, information about activity detected by the peripheral device, where the information includes at least one activity tag, (2) identifying a hash function, (3) providing the at least one activity tag to the hash function to generate at least one hash value, (4) encrypting, using an encryption key that is accessible to the centralized management hub, at least a subset of the information to produce encrypted information, and (5) causing a server device to store, in an activity log associated with the centralized management hub, an activity log entry that includes: a timestamp corresponding to a time at which the activity log entry is stored, the at least one hash value, and the encrypted information.

24 Claims, 14 Drawing Sheets

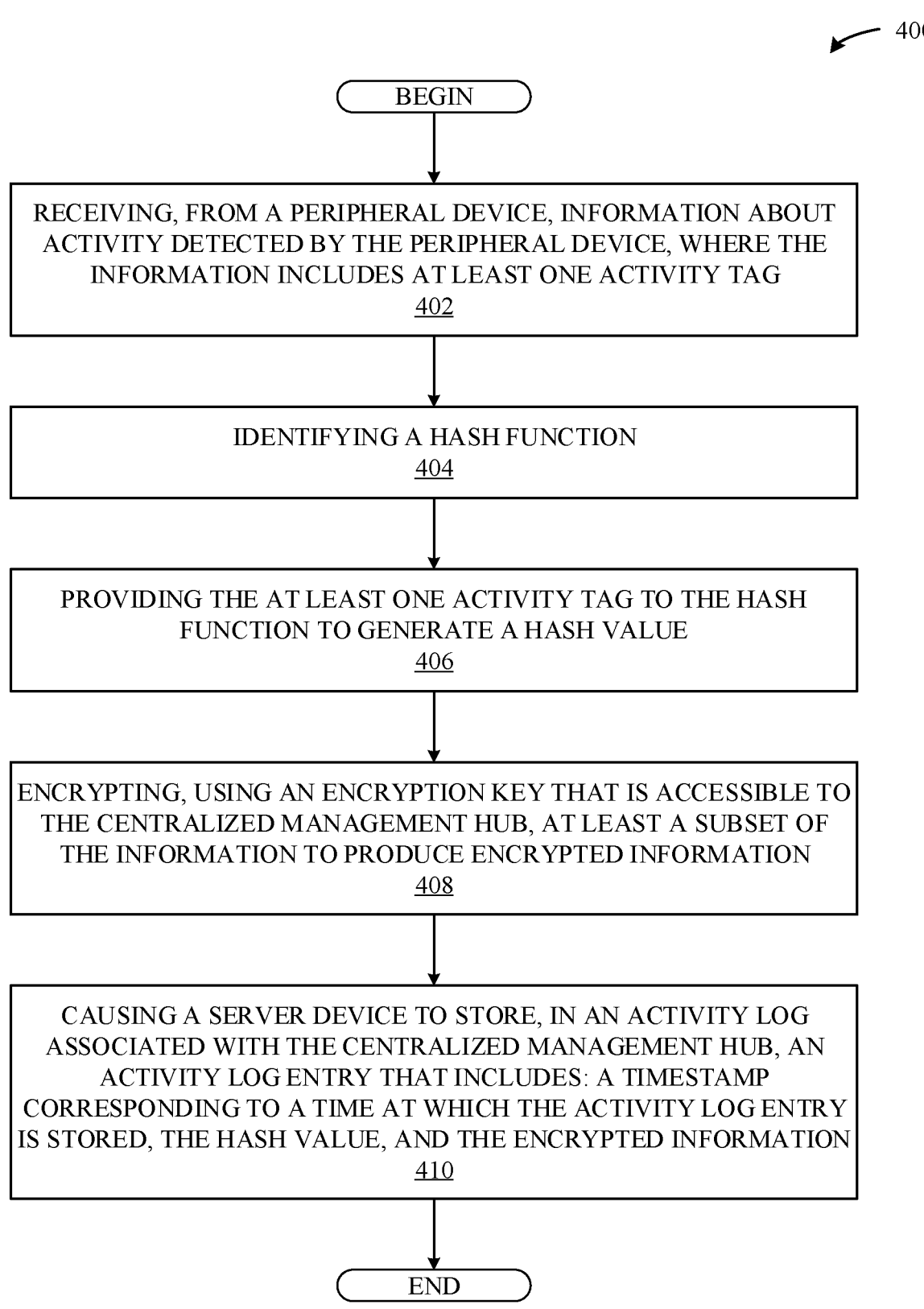

400

BEGIN

RECEIVING, FROM A PERIPHERAL DEVICE, INFORMATION ABOUT ACTIVITY DETECTED BY THE PERIPHERAL DEVICE, WHERE THE INFORMATION INCLUDES AT LEAST ONE ACTIVITY TAG
402

IDENTIFYING A HASH FUNCTION
404

PROVIDING THE AT LEAST ONE ACTIVITY TAG TO THE HASH FUNCTION TO GENERATE A HASH VALUE
406

ENCRYPTING, USING AN ENCRYPTION KEY THAT IS ACCESSIBLE TO THE CENTRALIZED MANAGEMENT HUB, AT LEAST A SUBSET OF THE INFORMATION TO PRODUCE ENCRYPTED INFORMATION
408

CAUSING A SERVER DEVICE TO STORE, IN AN ACTIVITY LOG ASSOCIATED WITH THE CENTRALIZED MANAGEMENT HUB, AN ACTIVITY LOG ENTRY THAT INCLUDES: A TIMESTAMP CORRESPONDING TO A TIME AT WHICH THE ACTIVITY LOG ENTRY IS STORED, THE HASH VALUE, AND THE ENCRYPTED INFORMATION
410

END

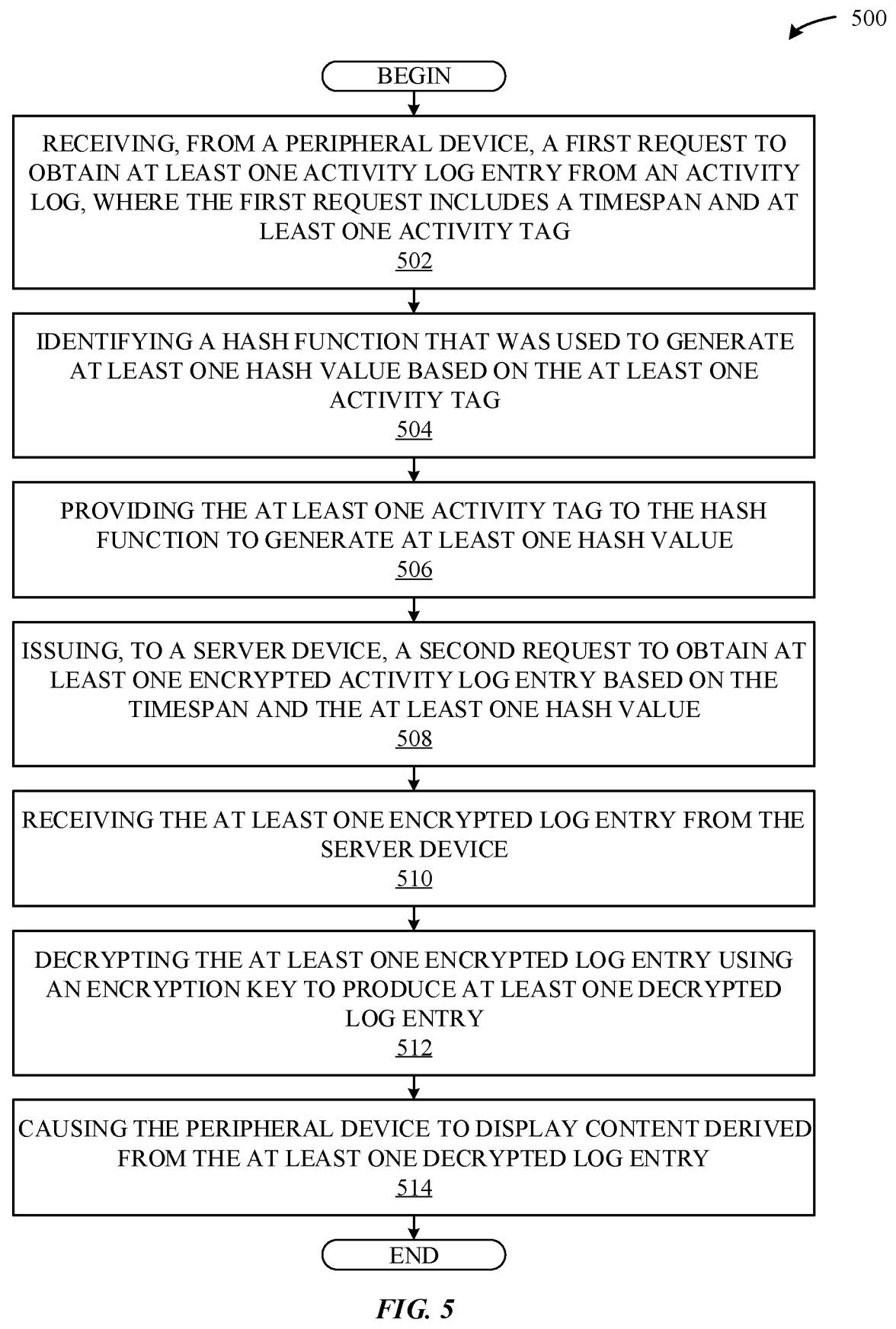

BEGIN

RECEIVING, FROM A PERIPHERAL DEVICE, A FIRST REQUEST TO OBTAIN AT LEAST ONE ACTIVITY LOG ENTRY FROM AN ACTIVITY LOG, WHERE THE FIRST REQUEST INCLUDES A TIMESPAN AND AT LEAST ONE ACTIVITY TAG
502

IDENTIFYING A HASH FUNCTION THAT WAS USED TO GENERATE AT LEAST ONE HASH VALUE BASED ON THE AT LEAST ONE ACTIVITY TAG
504

PROVIDING THE AT LEAST ONE ACTIVITY TAG TO THE HASH FUNCTION TO GENERATE AT LEAST ONE HASH VALUE
506

ISSUING, TO A SERVER DEVICE, A SECOND REQUEST TO OBTAIN AT LEAST ONE ENCRYPTED ACTIVITY LOG ENTRY BASED ON THE TIMESPAN AND THE AT LEAST ONE HASH VALUE
508

RECEIVING THE AT LEAST ONE ENCRYPTED LOG ENTRY FROM THE SERVER DEVICE
510

DECRYPTING THE AT LEAST ONE ENCRYPTED LOG ENTRY USING AN ENCRYPTION KEY TO PRODUCE AT LEAST ONE DECRYPTED LOG ENTRY
512

CAUSING THE PERIPHERAL DEVICE TO DISPLAY CONTENT DERIVED FROM THE AT LEAST ONE DECRYPTED LOG ENTRY
514

END

*FIG. 5*

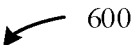
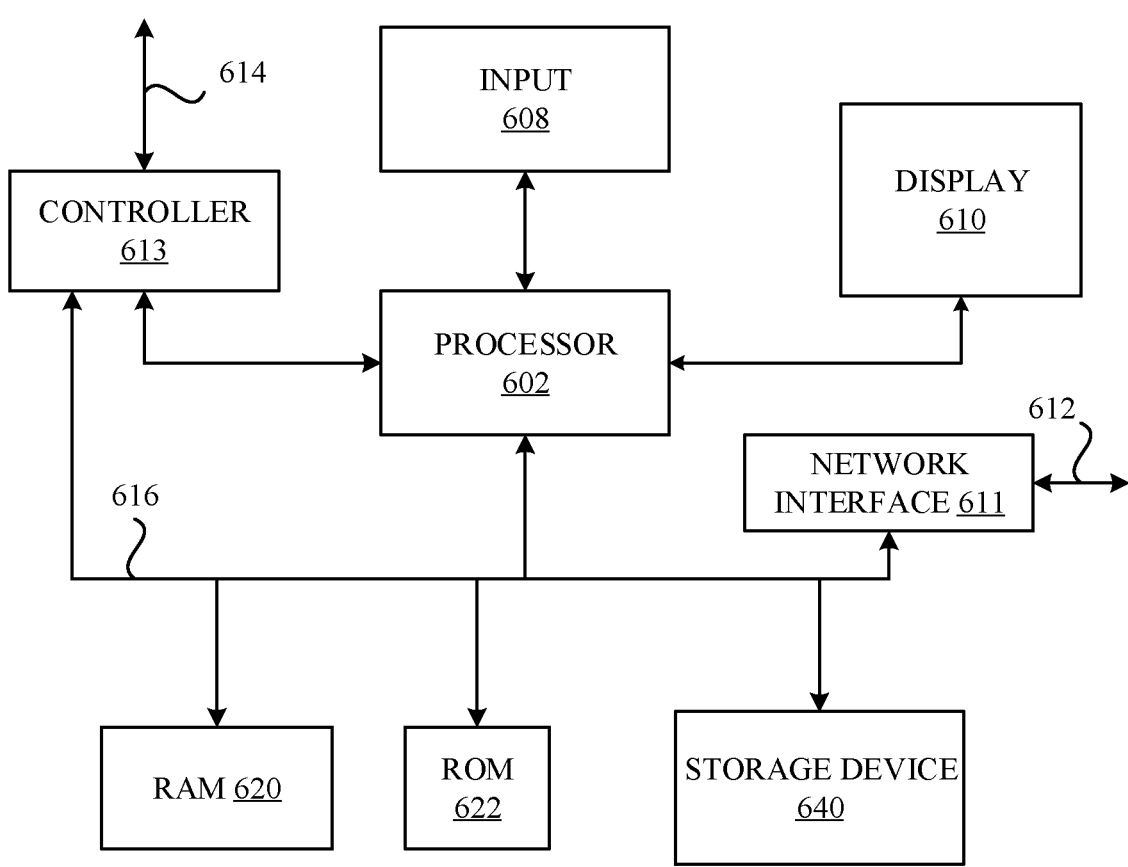
*FIG. 6*

TECHNIQUES FOR MANAGING ACTIVITY LOGS IN A MANNER THAT PROMOTES USER PRIVACY

CROSS-REFERENCE TO RELATED APPLICATIONS

The present application claims the benefit of U.S. Provisional Application No. 63/506,051, entitled "TECHNIQUES FOR MANAGING ACTIVITY LOGS IN A MANNER THAT PROMOTES USER PRIVACY," filed Jun. 2, 2023, the content of which is incorporated by reference herein in its entirety for all purposes

FIELD

The described embodiments set forth techniques for managing activity logs in a manner that promotes user privacy. In particular, the techniques involve activity log storage and retrieval procedures between client and server devices that inhibit the server devices from discerning potentially sensitive information included in the activity logs.

BACKGROUND

Smart home devices refer to electronic devices that implement home automation functionalities. Smart home devices can include, for example, smart thermostat devices, smart lighting devices, smart lock devices, smart garage devices, smart camera devices, and so on. One key element of smart home systems are smart home hubs, which act as central control systems for various smart home devices that are included in homes. A given smart home hub can be implemented in different forms, such as a standalone device or a built-in component of other devices (e.g., a smart speaker, a home entertainment system, etc.), and is responsible for facilitating communications between the smart home devices and remote computing devices. In most cases, the smart home devices communicate with smart home hubs via wireless protocols (e.g., Wi-Fi, Bluetooth, etc.). Additionally, the smart home hubs typically connect to the home's Wi-Fi network to communicate with the remote computing devices—and, in most cases, gain access to the Internet. Access to the Internet can enable a variety of useful functionalities to be implemented, such as enabling individuals to control the smart home devices outside of the home, enabling activity logs associated with the smart home devices to be managed by one or more external services, and so on.

The number of categories of smart home devices in a given home typically corresponds to the number of smart home software applications ("smart home apps") that are installed on the remote computing devices associated with the smart home. For example, in a smart home that includes (i) a single smart thermostat, (ii) twenty-five smart lighting devices, (iii) two smart lock devices, (iv) one smart garage device, and (v) four smart camera devices, one or more of the remote computing devices likely will include (i) a smart thermostat app, (ii) a smart lighting app, (iii) a smart lock app, (iv) a smart garage door app, and (v) a smart camera app. In this regard, the proliferation of available smart home devices has resulted in heavily fragmented systems that are cumbersome for individuals to manage. For example, an individual who resides in the foregoing example smart home may be required to individually access a majority of the applications during isolated events (e.g., morning routine, bed time routine, etc.) in order to configure the smart home according to the individual's preferences.

Various organizations have, in an effective manner, mitigated the foregoing issues by providing software applications and hardware devices that centralize the control of smart home devices under a unified management interface. In particular, the various smart home hubs of a given home can be configured to interact with a centralized management device—such as a smart home speaker that is capable of communicating with different smart home hubs (and, by extension, the smart home devices that communicate with the smart home hubs)—and the centralized management device can be accessed by a centralized smart home app executing on one or more of the remote computing devices. In this manner, a user of a remote computing device is able to interact with the various smart home devices through the (single) centralized smart home app, rather than numerous smart home apps that are highly specific to the various smart home devices.

As previously described herein, activity logging is an important aspect of smart home functionality. For example, it can be useful to a given individual to determine times at which their garage door was opened/closed, times at which motion was detected by their smart cameras, times at which their doors/locks were articulated, times at which their sprinkler systems were activated/deactivated, and so on. Accordingly, when the individual's home automation system constitutes a fragmented setup—i.e., one that does not include a centralized management device—the respective activity logs gathered by the smart home hubs are provided to/managed by the respective smart home apps. In this regard, each smart home app is restricted to viewing only the activity that it is assigned to manage, which can be beneficial in terms of privacy concerns. Conversely, when the individual has implemented a unified home automation system—i.e., one that includes a centralized management device—the respective activity logs gathered by the smart home hubs are provided to/managed by the centralized management device/smart home app, which may establish privacy concerns for the user.

Accordingly, what is needed is an effective approach for enabling individuals to enjoy the benefits of unified home automation systems while preserving their privacy with respect to the unified activity logging inherent in such systems.

SUMMARY

The described embodiments set forth techniques for managing activity logs in a manner that promotes user privacy. In particular, the techniques involve activity log storage and retrieval procedures between client and server devices that inhibit the server devices from discerning potentially sensitive information included in the activity logs.

One embodiment sets forth a method for managing activity logs in a manner that promotes user privacy. According to some embodiments, the method can be implemented at a centralized management hub, and includes the steps of (1) receiving, from a peripheral device, information about activity detected by the peripheral device, where the information includes at least one activity tag. (2) identifying a hash function, (3) providing the at least one activity tag to the hash function to generate at least one hash value, (4) encrypting, using an encryption key that is accessible to the centralized management hub, at least a subset of the information to produce encrypted information, and (5) causing a server device to store, in an activity log associated with the centralized management hub, an activity log entry that includes: a timestamp corresponding to a time at which the activity log entry is stored, the at least one hash value, and the encrypted information.

Another embodiment sets forth a method for accessing activity logs. According to some embodiments, the method can be implemented at a centralized management hub, and includes the steps of (1) receiving, from a peripheral device, a first request to obtain at least one activity log entry from an activity log, where the first request includes a timespan and at least one activity tag, (2) identifying a hash function that was used to generate at least one hash value based on the at least one activity tag, (3) providing the at least one activity tag to the hash function to generate at least one hash value, (4) issuing, to a server device, a second request to obtain at least one encrypted activity log entry based on the timespan and the at least one hash value. (5) receiving the at least one encrypted log entry from the server device, (6) decrypting the at least one encrypted log entry using an encryption key to produce at least one decrypted log entry, and (7) causing the peripheral device to display content derived from the at least one decrypted log entry.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

FIG. 4 illustrates a method for storing activity logs in a manner that promotes user privacy, according to some embodiments.

FIG. 5 illustrates a method for recalling activity logs in a manner that promotes user privacy, according to some embodiments.

FIG. 6 illustrates a detailed view of a computing device that can be used to implement the various components described herein, according to some embodiments.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The described embodiments set forth techniques for managing activity logs in a manner that promotes user privacy. In particular, the techniques involve activity log storage and retrieval procedures between client and server devices that inhibit the server devices from discerning potentially sensitive information included in the activity logs.

Figure 1A:
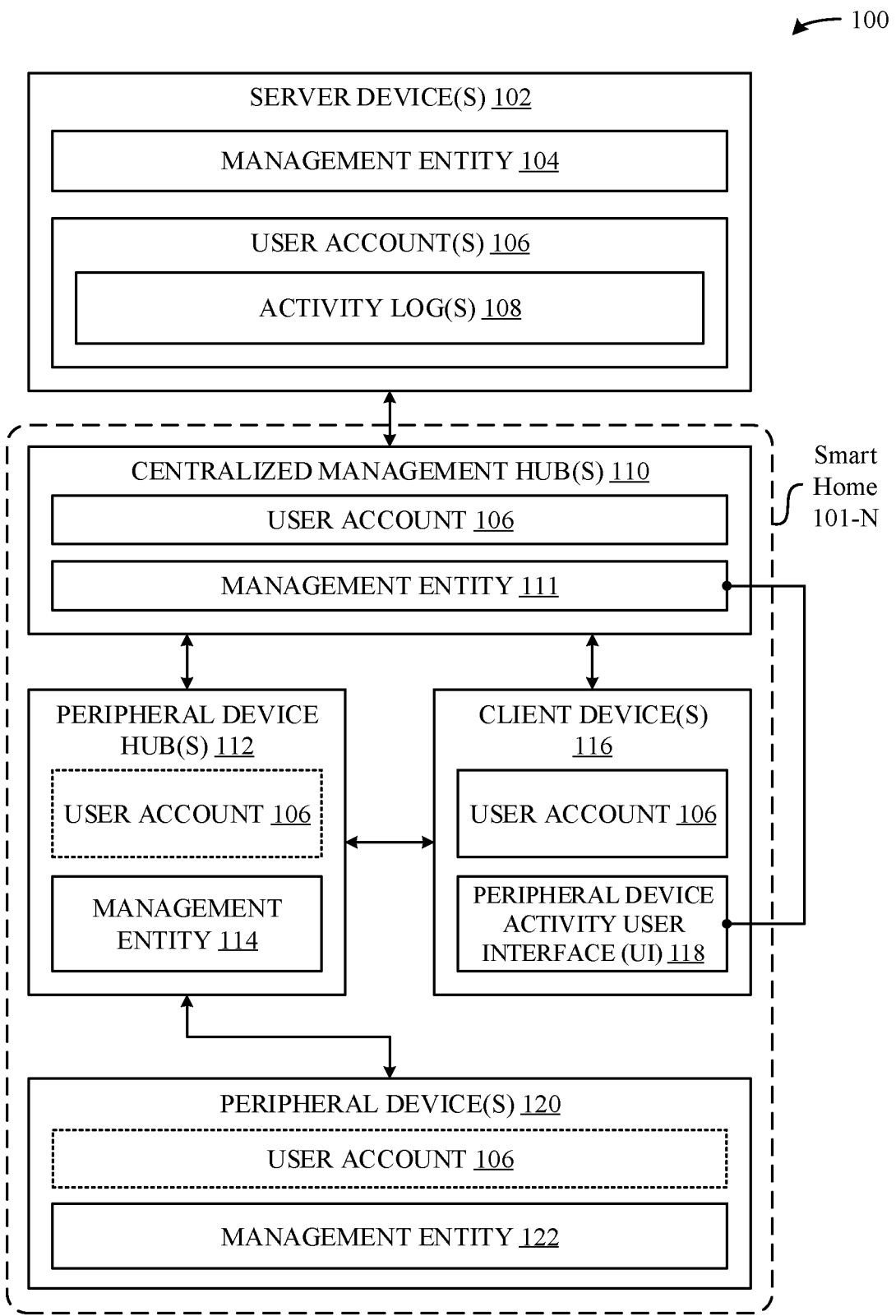
FIG. 1A illustrates a block diagram of different components of a system that can be configured to implement the various techniques described herein, according to some embodiments.

FIG. 1A illustrates a block diagram of different components of a system 100 that can be configured to implement the various techniques described herein, according to some embodiments. As shown in FIG. 1A, the system 100 can include one or more server computing devices 102. The system 100 can also include one or more smart homes 101 that each represent an individual home, structure, etc., in which home automation components are utilized. As shown in FIG. 1A, the smart home 101 can include one or more centralized management hubs 110, one or more peripheral device hubs 112, one or more client devices 116, and one or more peripheral devices 120.

According to some embodiments, one or more of the server computing devices 102 can represent an entity, e.g., an organization, a service, etc., that provides the activity log management services described herein. According to some embodiments, a given server computing device 102 can include a management entity 104 that is configured to interface with the centralized management hubs 110, the peripheral device hubs 112, the client devices 116, and/or the peripheral devices 120. In particular, the management entity 104 can be configured to process activity log requests (e.g., delete, write, overwrite, read, etc.) issued by the centralized management hubs 110, the peripheral device hubs 112, the client devices 116, and/or the peripheral devices 120, in accordance with the techniques described herein. As shown in FIG. 1A, the management entity 104 can associate any number of activity logs 108 with any number of user accounts 106 that are linked to the centralized management hubs 110, the peripheral device hubs 112, the client devices 116, and/or the peripheral devices 120, in order to effectively process the activity log requests issued by such devices.

As a brief aside, it is noted that each client device 116 can have any number of software applications (smart home apps or otherwise) installed thereon and can implement a software application manager that is configured to facilitate installations, executions (e.g., loading, displaying, etc.), and so on, of the software applications. Each client device 116 can also be associated with a user account 106. Such an association can be established, for example, when a user of the client device 116 provides the requisite information to create, log into, etc., a user account 106 using the client device 116. According to some embodiments, a user account

106 for a user can include username/password information, contact information associated with the user, demographic information associated with the user, and so on. It is noted that the foregoing examples are not meant to be limiting, and that the user accounts 106 can store any user-related (or other) information, at any level of granularity, without departing from the scope of this disclosure.

According to some embodiments, a given peripheral device 120 executing a management entity 122 can represent a device that is capable of performing different functionalities from which activity log information can be derived. For example, the peripheral device 120 can represent any smart home device, e.g., a smart speaker, a smart thermostat, a smart lock, a smart camera, a smart light bulb/light switch, a smart plug, a smart smoke detector, a smart doorbell, a smart garage door opener, a smart irrigation system, a smart appliance, a smart window blind, a smart air purifier, a smart vacuum cleaner, and the like. In this regard, activity log information can be generated in conjunction with functionalities that are carried out by the peripheral device 120. For example, if the peripheral device 120 is a smart lock, then the activity log information can include lock and unlock events. In another example, if the peripheral device 120 is a smart camera, then the activity log information can include motion events, sound events, and so on.

It is noted that the foregoing examples are not meant to be limiting, and that the peripheral device 120 can represent any device from which activity log information can be derived, without departing from the scope of this disclosure. It is also noted that the activity log information can be derived from and/or provided by devices other than the peripheral devices 120. In particular, the peripheral device hubs 112, the client devices 116, the centralized management hub 110, and/or other devices not illustrated in FIG. 1A can be configured to generate activity log information, based on any activity, at any level of granularity, without departing from the scope of this disclosure. For example, the centralized management hub 110 can generate activity information based on information the centralized management hub 110 receives from the peripheral device hubs 112 and/or the peripheral devices 120, the client devices 116 can generate activity information based on activities performed on the client devices 116, and so on.

As described herein, a given peripheral device 120 can be configured to interface with one or more peripheral device hubs 112. For example, a group of peripheral devices 120 that represent smart light switches can be configured to communicate with a peripheral device hub 112 using standardized, proprietary, etc., wireless communications. In another example, a group of peripheral devices that represent smart window blinds can be configured to communicate with a peripheral device hub 112 using wired communications. In the foregoing examples, one or more of the client devices 116 typically include individual software applications ("smart home apps") that correspond to respective ones of the peripheral device hubs 112 and enable the peripheral devices 120 to be controlled via the peripheral device hubs 112. In particular, the smart home apps can be configured to interface with management entities 114 executing on the peripheral device hubs 112 in order to access the available functionalities of the peripheral devices 120 controlled by the peripheral device hubs 112. It is noted, however, that some peripheral devices 120 can be configured to operate without the need for peripheral device hubs 112. For example, a peripheral device 120 that represents a smart garage door opener can be configured to interface directly with one or more of the client devices 116, the centralized management hub 110, and so on, without the involvement of a peripheral device hub 112. In this example, one or more of the client devices 116 can include a smart home app that enables the client devices 116 to communicate directly with the smart garage door opener (e.g., over a connection formed using Wi-Fi, Bluetooth, the Internet, etc.). In another example, the smart garage door opener can be configured to identify and interface with the centralized management hub 110 independent from any other devices.

As described herein, the implementation of various peripheral device hubs 112/peripheral devices 120 in a given smart home 101 can result in a heavily fragmented system that can be cumbersome for individuals to manage. In particular, an individual who resides in a smart home 101 may be required to individually access different smart home apps each time they would like to interact with the peripheral devices 120. Accordingly, a centralized management hub 110 that includes a management entity 111 can be employed to centralize the functionalities of the peripheral device hubs 112/peripheral devices 120 under a common interface. In this regard, a given centralized management hub 110 can represent a centralized management device that is capable of communicating with any number of peripheral device hubs 112, peripheral devices 120, and/or client devices 116. In one example, the centralized management hub 110 can represent a standalone device that is solely designed to centralize the control of different peripheral devices 120, e.g., in conjunction with a peripheral device activity user interface (UI) 118 implemented on the client devices 116 (the details of which are described below in greater detail). In another example, the centralized management hub 110 can represent a device that provides additional functionalities to those described above, such as smart home device functionalities. For example, the centralized management hub 110 can provide smart speaker functionalities, streaming device functionalities, and the like, in addition to the centralization functionalities described herein.

It is noted that the foregoing examples are not meant to be limiting, and that the centralized management hub 110 can be configured to provide any number of functionalities (in addition to the centralization functionalities described herein) without departing from the scope of this disclosure. Additionally, it is noted that the embodiments do not rely on one or more of the centralized management hubs 110 to provide the functionalities described herein. In particular, the functionalities of the centralized management hub 110 can be implemented, in whole or in part, by one or more of the peripheral device hubs 112, the peripheral devices 120, the client devices 116, and/or other device(s) not illustrated in FIG. 1A. For example, one or more of the peripheral device hubs 112, the client devices 116, and/or the peripheral devices 120 can be configured to interface directly/indirectly with one another, as well as the server computing devices 102, without departing from the scope of this disclosure.

It should be understood that the various components of the computing devices illustrated in FIG. 1A are presented at a high level in the interest of simplification. For example, although not illustrated in FIG. 1A, it should be appreciated that the various computing devices can include common hardware/software components that enable the above-described software entities to be implemented. For example, each of the computing devices can include one or more processors that, in conjunction with one or more volatile memories (e.g., a dynamic random-access memory (DRAM)) and one or more storage devices (e.g., hard drives, solid-state drives (SSDs), etc.), enable the various software entities described herein to be executed. Moreover, each of the computing devices can include communications components that enable the computing devices to transmit information between one another.

A more detailed explanation of these hardware components is provided below in conjunction with FIG. 6. It should additionally be understood that the computing devices can include additional entities that enable the implementation of the various techniques described herein without departing from the scope of this disclosure. It should additionally be understood that the entities described herein can be combined or split into additional entities without departing from the scope of this disclosure. It should further be understood that the various entities described herein can be implemented using software-based or hardware-based approaches without departing from the scope of this disclosure.

Accordingly, FIG. 1A provides an overview of the manner in which the system 100 can implement the various techniques described herein, according to some embodiments. A more detailed breakdown of the manner in which these techniques can be implemented will now be provided below in conjunction with FIGS. 1B, 2A-2B, 3A-3G, and 4-5.

Figure 1B:
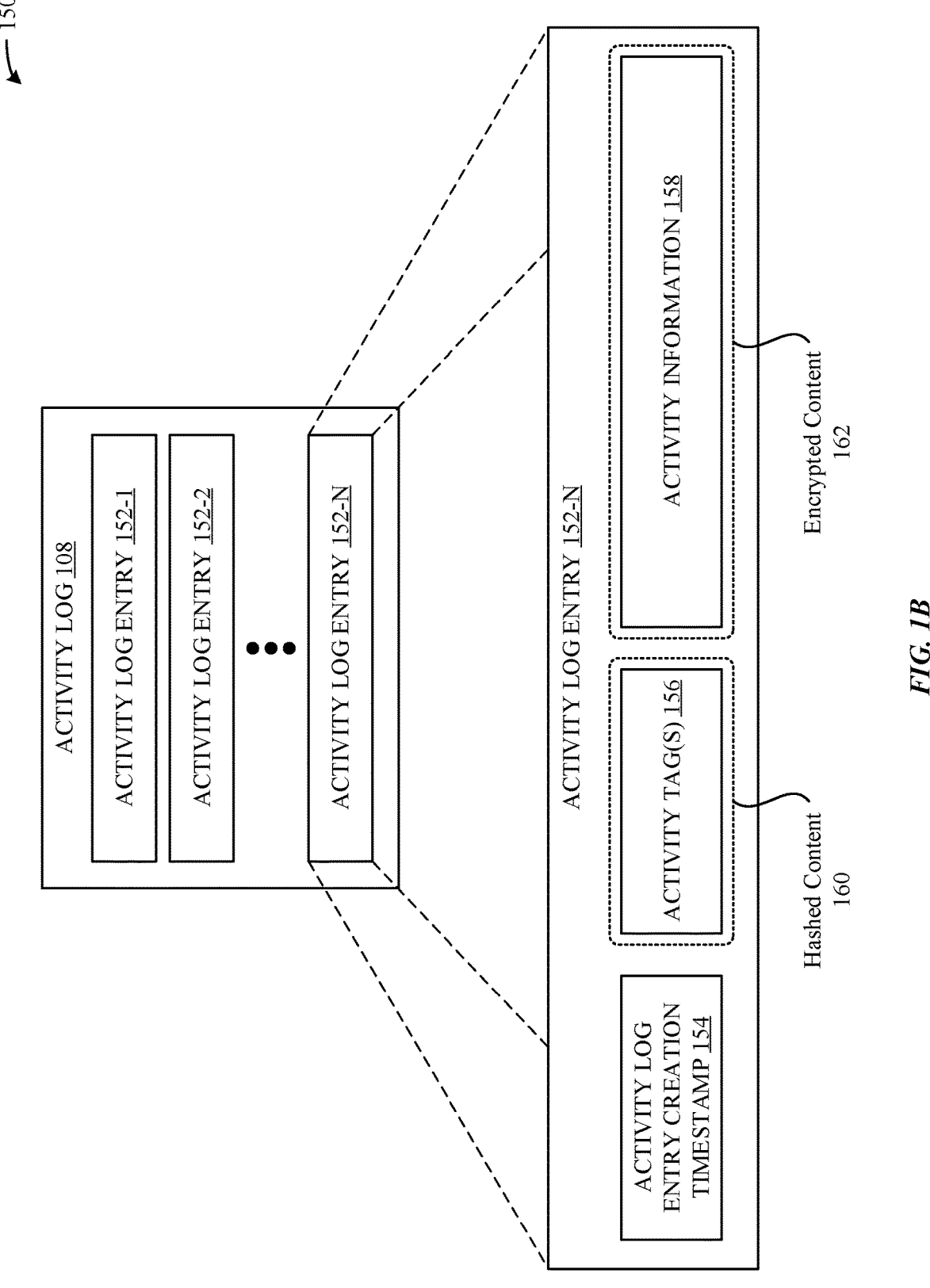
FIG. 1B illustrates a conceptual diagram of an example approach for implementing an activity log, according to some embodiments.

FIG. 1B illustrates a conceptual diagram 150 of an example approach for implementing an activity log 108, according to some embodiments. As shown in FIG. 1B, a given activity log 108 can include any number of activity log entries 152, where each activity log entry 152 can include an activity log entry creation timestamp 154, one or more activity tags 156, and activity information 158. As previously described herein, a given activity log 108 can be associated with a user account 106. Moreover, the activity log 108 can store activity log entries 152 associated with a specific peripheral device 120, or associated with multiple peripheral devices 120 (e.g., tied to a single peripheral device hub 112, tied to multiple peripheral device hubs 112 (e.g., under the management of a centralized management hub 110), and so on). In this regard, various design tradeoffs can be made to achieve a desired level of performance. For example, managing a higher number of activity logs 108 for a given smart home 101/user account 106 can result in faster storage-related operations, but can also result in a higher consumption of storage space. Conversely, managing a lower number of activity logs 108 for the smart home 101/user account 106 can result in slower storage-related operations, but also can result in a lower consumption of storage space. It is noted that the foregoing examples are not meant to be limiting, and that any number of activity logs 108, at any level of granularity, can be managed for a given smart home 101/user account 106 without departing from scope of this disclosure.

According to some embodiments, the activity log creation timestamp 154 can represent a time at which the activity log entry 152 is generated by a server computing device 102. As described herein, the server computing device 102 can receive requests to store activity log information from a given centralized management hub 110 (or a given peripheral device hub 112, peripheral device 120, client device 116, etc., depending on a configuration). In turn, the server computing device 102 can interface with a storage service (e.g., a local/network/remote storage device, database, etc.) to generate an activity log entry 152 that is timestamped in accordance with the creation time of the activity log entry 152.

According to some embodiments, each activity tag 156 can be assigned a respective value so that the activity tags 156 can effectively function as key values for looking up activity log entries 152. For example, when an activity log entry 152 corresponds to an unlock event reported by a smart lock installed on the front door of the smart home 101, the activity log entry 152 can be assigned two activity tags 156 having the values "Unlock" and "Front Door" (respectively). The activity log entry 152 can also be assigned an activity tag 156 having a value of a unique identifier that corresponds to the smart lock within the context of the smart home 101 in which the smart lock is installed, e.g., "Front_ Door_Lock". In another example, when an activity log entry 152 corresponds to a motion event detected by a smart camera in an entry way of the smart home 101, the activity log entry 152 can be assigned two activity tags 156 having the values "Motion" and "Entry Way" (respectively). The activity log entry 152 can also be assigned an activity tag 156 having a value of a unique identifier that corresponds to the smart camera within the context of the smart home 101 in which the smart camera is installed, e.g., "Entry_Way_ Camera". It is noted that the foregoing examples are not meant to be limiting, and that any number of activity tags 156 can be assigned to an activity log entry 152 without departing from the scope of this disclosure.

According to some embodiments, the activity information 158 can store content information associated with the activity from which the activity log entry 152 is derived. For example, when a given activity log entry 152 corresponds to a motion event reported by a smart camera, the activity information 158 can include a time at which the motion event was detected by the smart camera, media content (e.g., audio/video) that spans across (i.e., before and after) the time the motion event was detected, and so on. In another example, when a given activity log entry 152 corresponds to a garage door open event reported by a smart garage door opener, the activity information 158 can include a time at which the garage door open event occurred, the origin of a command that provoked the garage door to open (e.g., a smart phone app, a garage door code panel, a garage door remote, a physical garage door button, etc.), and so on. It is noted that the foregoing examples are not meant to be limiting, and that any amount, type, etc., of information, at any level of granularity, can be included in the activity information 158, without departing from the scope of this disclosure.

Accordingly, the activity log entries 152 include activity tags 156 that can effectively function as key values for looking up activity log entries 152, and can also include activity information 158 that is relevant to the activity from which the activity log entry 152 is derived. In this regard, the activity log entries 152 may be sensitive/private in nature, especially when they are associated with activity that takes place within an individual's home, a proprietor's business, and so on. Accordingly, it is desirable to inhibit the server computing device(s) 102 from accessing this information. To achieve this end, the activity tags 156 of a given activity log entry 152 can be hashed by the entity that provides the information to the server computing device 102, e.g., a centralized management hub 110, a peripheral device hub 112, a client device 116, or a peripheral device 120. Specifically, a value intended to be assigned to an activity tag 156 can first be provided to a hash function to produce a hashed result, and the hashed result can be assigned to the activity tag 156 (illustrated in FIG. 1B as hashed content 160). In this manner—and, as described in greater detail below—the server computing device(s) 102 will remain capable of performing lookups of activity log entries 152, while remaining incapable of deriving any useful information from the activity tags 156 included in the activity log entries 152.

Additionally, the activity information 158 of a given activity log entry 152 can be encrypted by the entity that provides the activity log entry 152 to the server computing device 102, e.g., a centralized management hub 110, a peripheral device hub 112, a client device 116, or a peripheral device 120. Specifically, the information intended to be assigned to the activity information 158 can be encrypted using an encryption key (that is accessible to the entity that provides the activity information 158) to produce an encrypted result, and the encrypted result can be assigned to the activity information 158 (illustrated in FIG. 1B as encrypted content 162). In this manner—and, as described in greater detail below—the server computing device(s) 102 will remain incapable of deriving any useful information from the activity information 158 included in the activity log entries 152.

Accordingly, FIG. 1B provides an overview of the manner in which the activity logs 108 can be implemented, according to some embodiments. A more detailed breakdown of the manner in which the entities illustrated in FIG. 1A can manage activity logs 108 to promote user privacy will now be provided below in conjunction with FIGS. 2A-2B, 3A-3G, and 4-5.

Figure 2A:
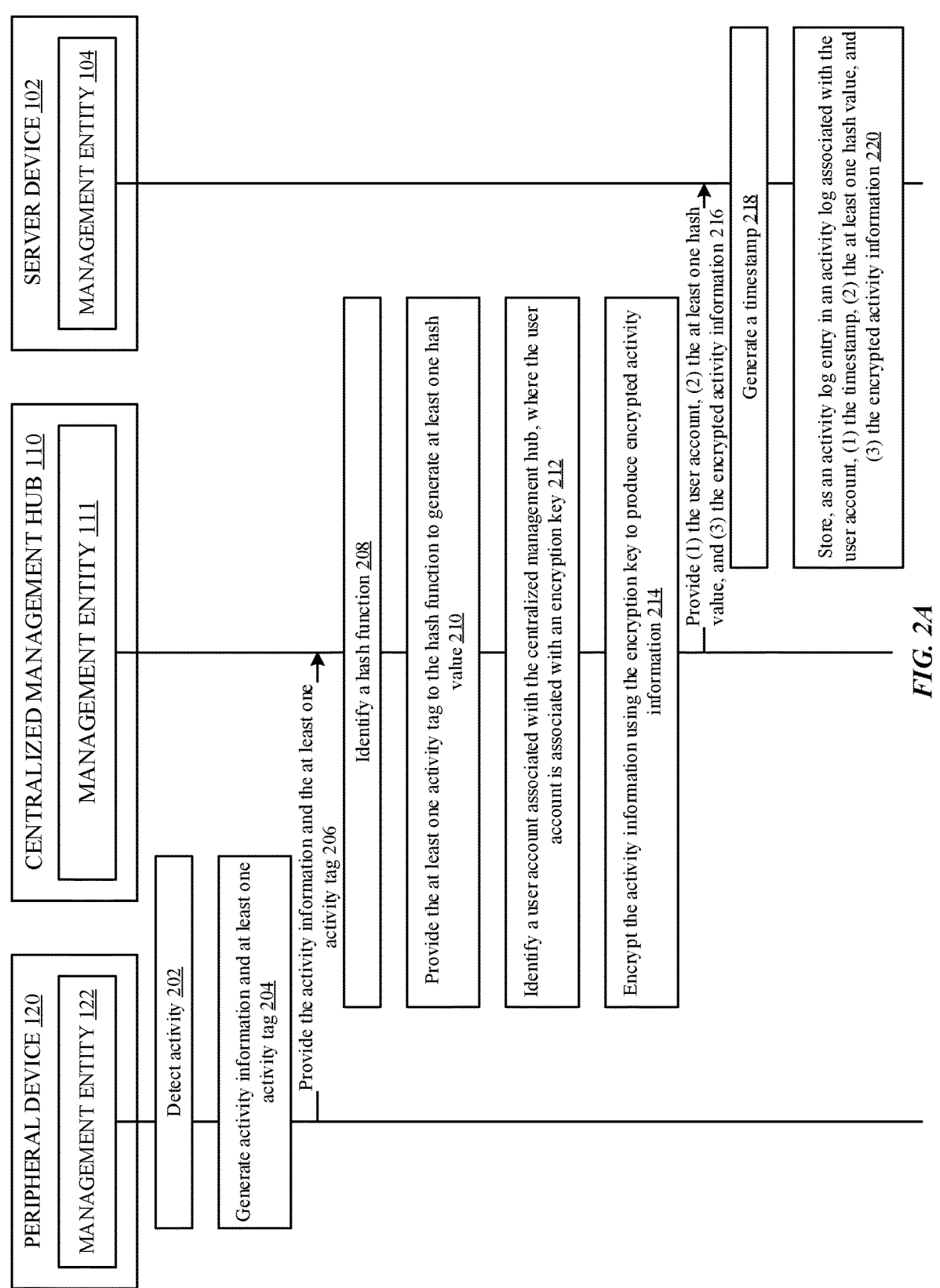
FIGS. 2A-2B illustrate sequence diagrams of the manner in which activity logs can be managed to promote user privacy, according to some embodiments.
Figure 2B:
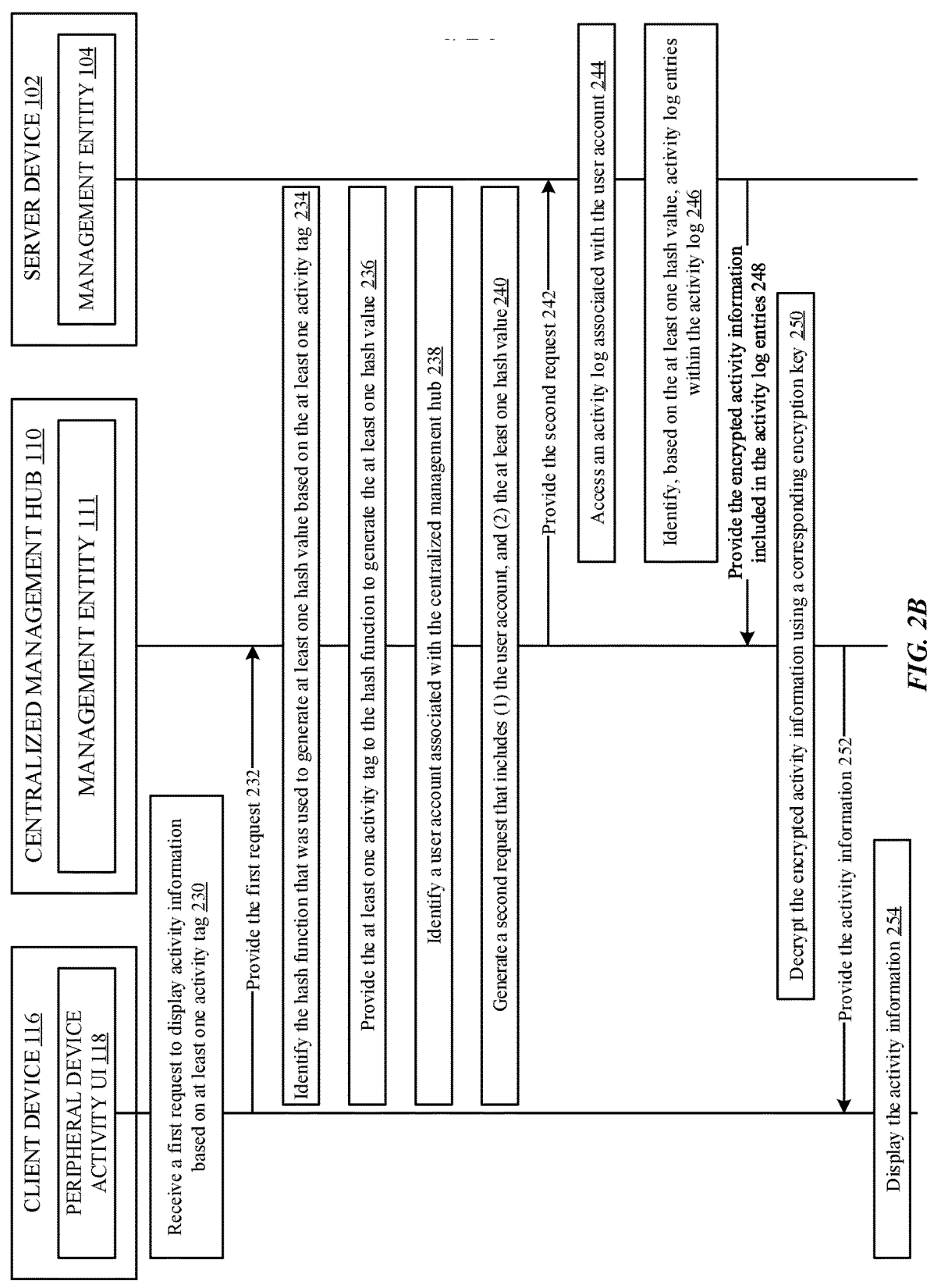

FIGS. 2A-2B illustrate sequence diagrams of the manner in which activity logs 108 can be managed to promote user privacy, according to some embodiments. In particular, the sequence diagram illustrated in FIG. 2A depicts interactions that can take place between a peripheral device 120, a centralized management hub 110, and a server computing device 102, according to some embodiments. As a brief aside, it is noted that a peripheral device hub 112 is omitted from the sequence diagram of FIG. 2A in the interest of providing a more simplified understanding of the embodiments. In that regard, it should be understood that one or more of the operations performed by the peripheral device 120, the centralized management hub 110, etc., in FIGS. 2A-2B can be performed by one or more peripheral device hubs 112 (or other device(s) with which the peripheral device 120 is communicating), according to some embodiments.

As shown in FIG. 2A, at step 202, the peripheral device 120 detects activity. As described herein, such activity can include any function performed by, detected by, caused by, etc., the peripheral device 120. For example, if the peripheral device 120 represents a smart vacuum cleaner, then the activity can involve the smart vacuum cleaner commencing an automated vacuuming cycle. In another example, if the peripheral device 120 represents a smart doorbell, then the activity can involve the smart doorbell detecting motion, receiving a button press, and/or the like. In yet another example, if the peripheral device 120 represents an external storage device (e.g., a network attached storage (NAS) device), then the activity can involve the external storage device receiving and processing a request to read data, write data, delete data, and so on. Again, it is noted that these examples are not meant to be limiting, and that step 202 can involve the peripheral device 120 (and/or another device) detecting any form of activity without departing from the scope of this disclosure.

At step 204, the peripheral device 120 generates activity information 158 and at least one activity tag 156. As described herein, the activity information 158 can include content information associated with the detected activity. For example, if the activity involves a smart lighting system receiving a command to turn of various smart switches in a smart home 101, then the activity information 158 can store a time at which the command is received, a description of an originating device, service, trigger, etc., associated with the command, unique identifiers associated with the smart switches, responses received from the smart switches (e.g., indications of success/failure) in relation to commands provided to the smart switches to turn off, and so on. Again, it is noted that this example is not meant to be limiting, and that the activity information 158 can store any amount, type, etc., of information, at any level of granularity, without departing from the scope of this disclosure.

Additionally, and as described herein, any number of activity tags 156 can be generated in association with the activity, the device that detected the activity, and so on. For example, the peripheral device 120 can establish activity tags 156 for a unique identifier of the peripheral device 120, a category of the peripheral device, a category of the activity, and so on. Again, it is noted that these examples are not meant to be limiting, and that any number of activity tags 156, at any level of granularity, can be generated without departing from the scope of this disclosure.

At step 206, the peripheral device 120 provides, to the centralized management hub 110, the activity information 158 and the at least one activity tag 156, e.g., in accordance with the approaches discussed herein. This can involve, for example, the peripheral device 120 communicating, to the centralized management hub 110 using wired and/or wireless approaches, the activity information 158 and the at least one activity tag 156 generated at step 204, as well as any other information that is relevant to the activity. Again, in other embodiments, the peripheral device 120 can communicate such information to at least one corresponding intermediate device, such as the peripheral device hub 112, client device 116, etc., where, in turn, the intermediate device can modify, supplement, etc., the information, or simply forward the information to the centralized management hub 110.

At step 208, the centralized management hub 110 identifies a hash function to be used to produce hash values based on the at least one activity tag 156 generated at step 204. According to some embodiments, the hash function can constitute any mathematical function that receives a message of any length and generates a fixed-length output. For example, the hash function can constitute a cryptographic hash function, a non-cryptographic hash function, a password hashing function, and so on. The output of a hash function is typically a unique representation of the input message, where even a minor change in the input message results in a completely different hash value. The hash functions are also deterministic, meaning that given the same input, the output will always be the same. Accordingly—and, for reasons described below in conjunction with the steps of FIG. 2B—the hash function selection procedure can be implemented in a manner that enables the hash function to be identified—and subsequently reidentified—when an individual desires to retrieve the activity information 158 at a future time.

To achieve this end, the hash function can be selected from a pool of hash functions that are accessible to the centralized management hub 110. Under one example approach, each hash function in the pool can be associated with a unique timespan (e.g., a window of time during a given day, a particular day of the week, a particular week of the year, etc.), such that the selected hash function corresponds to the time at which the activity information 158/at least one activity tag 156 is received. In another example approach, each hash function can be associated with the unique identifier(s) of at least one peripheral device 120, at least one particular peripheral device hub 112, at least one client device 116, and/or other device(s), from which the activity information 158/at least one activity tag 156 is derived, received, and so on. In yet another example approach, each hash function can be associated with one or more activity tags 156. It is noted that the foregoing examples are not meant to be limiting, and that any number of hash functions can be managed, and can be selected based on any amount, type, etc., of information, without departing from the scope of this disclosure.

Notably, the foregoing approaches minimize the amount of information that is needed to identify, at subsequent times, the hash functions that were previously selected to generate hash values. Consider, for example, the time-based selection described above: when a request to (retroactively) view activity information 158 for a particular time period is received, the centralized management hub 110 can select the hash function based on the particular time period, which inherently is the same hash function that was selected at the time the activity information 158/activity tags 156 were originally received. Consider, additionally, the identifier-based selection described above: when a request to view activity information 158 for a particular peripheral device 120 is received, the centralized management hub 110 can select the hash function based on the unique identifier associated with the peripheral device 120, which inherently is the same hash function that was selected at the time the activity information 158/activity tags 156 were originally received. Again, it is noted that the foregoing approaches are merely exemplary, and that the centralized management hub 110 (or other device(s)) can manage the hash functions in any way that effectively enables the foregoing retroactive selection abilities to be implemented.

Additionally, it is noted that the hash functions can be dynamically generated without departing from the scope of this disclosure. For example, a new hash function can be generated each time the activity information 158/at least one activity tag 156 is provided at step 206. Under this approach, a time at which the activity information 158/at least one activity tag 156 is received would be associated with the hash function so that it could be retroactively selected (using techniques similar to the time-based selections described herein). It is noted that this approach would provide the highest level of security given a large number of hash functions are utilized, but would come at the cost of the increased amount of storage space needed to manage the hash functions, as well as the increased latency tied to looking up the hash functions. Additionally, it is noted that the activity tags 156 can be combined with supplemental information prior to submitting the activity tags 156 to the hash functions. In particular, the supplemental information can be private in that it is known to and maintained by the client device 116 (implementing the hash function) but unknown to and unmanaged by the server computing devices 102. This approach can beneficially prevent the server computing devices 102 from reversing the hash function (e.g., by implementing a rainbow table).

In any case, at step 210, the centralized management hub 110 provides the activity tags 156 to the hash function to generate at least one hash value. Again, as described herein, the hash function can constitute any mathematical function that receives a message of any length and generates a fixed-length output. For example, the hash function can constitute a cryptographic hash function, a non-cryptographic hash function, a password hashing function, and so on. The output of a hash function is typically a unique representation of the input message, where even a minor change in the input message results in a completely different hash value. The hash functions are also deterministic, meaning that given the same input, the output will always be the same. Accordingly, at the conclusion of step 210, a respective hash value exists for each of the activity tags 156 (i.e., the hashed content 160 described above in conjunction with FIG. 1B).

At step 212, the centralized management hub 110 identifies a user account 106 associated with the centralized management hub 110, where the user account 106 is associated with an encryption key. According to some embodiments, the encryption key can be known to one or more of the devices in the smart home 101 but not known to the server computing devices 102. In particular, the encryption key can be associated with the user account 106, such that each device in the smart home 101 that is logged into the user account 106—or has received shared credentials in connection to a successful login to the user account 106 an associated device—is able to access to the encryption key. For example, a client device 116 can login to the user account 106 through a server computing device 102 after receiving an input of a username and a password that is associated with the user account 106 and is verified by the server computing device 102. The client device 116 can then receive credentials from the server computing device 102 (e.g., session identifiers, encryption keys, etc.) that complete the login of user account 106 on the client device 116.

As described herein, the client device 116 can also share the credentials with one or more of the devices in the smart home 101 (e.g., through wired or wireless connections) to effectively login those devices to the user account 106 without requiring the username and password of the user account 106 to be individually entered on those devices. This can involve, for example, associating one of the centralized management hubs 110, peripheral device hubs 112, peripheral devices 120, and/or other devices with the client device 116/user account 106 during setup procedures performed on such devices. It is noted that the foregoing examples are not meant to be limiting, and that any approach can be utilized for effectively enabling one or more of the devices included in a smart home 101, where appropriate, to obtain access to the encryption key used to encrypt the activity information 158. Additionally, it is noted that any of the techniques described herein for selecting hash functions can also be implemented for selecting the encryption key at step 212, without departing from the scope of this disclosure.

At step 214, the centralized management hub 110 encrypts the activity information 158 using the encryption key to produce encrypted activity information 158 (i.e., the encrypted content 162 described above in conjunction with FIG. 1B). It is noted that that any form of encryption key—such as symmetric encryption keys, private encryption keys (with public encryption key counterparts), etc.—can be utilized to generate the encrypted activity information 158, without departing from the scope of this disclosure.

At step 216, the actor provides (1) the user account 106 (i.e., information associated with the user account 106), (2) the at least one hash value (i.e., the hashed content 160), and (3) the encrypted activity information (i.e., the encrypted content 162). According to some embodiments, the information associated with the user account 106 can include the username/password associated with the user account, one or more of the credentials received from the server computing device 102 in conjunction with a successful login of the user account 106 (e.g., session identifiers, encryption keys, etc.). In this manner, the server computing device 102 can effectively determine that the centralized management hub 110 is authorized to issue a request for storing the hashed content 160/the encrypted content 162 in association with the user account 106.

The server computing device 102 can also use the information to identify an area into which the hashed content 160/the encrypted content 162 should be stored, such as a container, database, etc., associated with the user account 106. It is noted that the hashed content 160 can also be used by the server computing device 102 to effectively route the storage of the hashed content 160/the encrypted content 162 when multiple activity logs 108 are managed in connection with the user account 106. For example, a separate container, database, etc., can be established for each unique value (i.e., hashed activity tag 156) included in the hashed content 160. This could result in, for example, a respective container, database, etc., being managed for each unique peripheral device 120, peripheral hub device 112, centralized management hub 110, category of activity, and so on. It is noted that the foregoing examples are not meant to be limiting, and that any number of containers, databases, etc., can be used to store the hashed content 160/the encrypted content 162, without departing from the scope of this disclosure.

At step 218, the server computing device 102 generates an activity log entry creation timestamp 154 (e.g., based on a time at which the centralized management hub 110 transmitted the information at step 216, a time at which the server computing device 102 received the information from the centralized management hub 110, and so on). At step 220, the server computing device 102 stores, as an activity log entry 152 in an activity log 108 associated with the user account 106. (1) the timestamp (i.e., the activity log entry creation timestamp 154), (2) the at least one hash value (i.e., the hashed content 160), and (3) the encrypted activity information (i.e., the encrypted content 162).

In view of the low latencies in modern communication platforms, it is likely that the activity log entry creation timestamp 154 is similar to the time at which the activity occurred (i.e., the detection at step 202). In this regard, the activity log entry creation timestamp 154 can enable the server computing device 102 to, at a subsequent time, effectively recover activity information 158 based on a specified time (or timespan), without needing to access (1) the content from which the hashed content 160 was derived (i.e., the activity tags 156) or (2) the content from which the encrypted content 162 was derived (i.e., the activity information 158). In this manner, privacy considerations are substantially enhanced, in that the server computing device 102 is exposed only to particular time or timespan that is of interest to an individual, rather than information (i.e., activity tags 156/activity information 158) that is personal to the individual and potentially sensitive in nature.

Under an alternative approach, the hashed content 160—i.e., the hashed activity tags 156—can enable the server computing device 102 to, at a subsequent time, effectively recover activity information 158 based on a specific activity tag 156 (or activity tags 156), without needing to access the encrypted content 162. In particular, and as described in greater detail below in conjunction with FIG. 2B, a client device 116 can, upon receiving a request to identify activity information 158 associated with one or more activity tags 156, identify the hash function(s) used to hash the activity tags 156 at the time the activity information 158 was originally received (e.g., at a step 202), and then reproduce the same hashed content 160 (i.e., hashed activity tags 156). In turn, the hashed content 160 can be provided to the server computing device 102 in conjunction with a lookup request, whereupon the server computing device 102 can perform a lookup based on the hashed content 160. Importantly, because the server computing device 102 does not have access to the hash function(s) used to generate the hashed content 160, the server computing device 102 remains oblivious to the plaintext/underlying content of the hashed content 160 (as well as the encrypted content 162 (i.e., the encrypted activity information 158)). However, the hashed content 160 nonetheless enables the server computing device 102 to effectively look up and return the activity log entries 152, if any, that match the hashed content 160.

Accordingly, under either of the foregoing approaches (i.e., activity log entry 152 lookups based on a time/timespan, and/or at least one hashed activity tag 156), the server computing device 102 can effectively function as an activity log entry 152 storage and lookup service while remaining incapable of accessing underlying (and potentially sensitive) information that is stored in the hashed content 160 (i.e., the activity tags 156) and/or the encrypted content 162 (i.e., the activity information 158).

FIG. 2B illustrates a sequence diagram of a lookup request for activity information 158 performed between a client device 116, a centralized management hub 110, and a server computing device 102, according to some embodiments. As shown in FIG. 2B, at step 230, the client device 116 receives a first request to display activity information 158 based on at least one activity tag 156. The first request can be generated, for example, in conjunction with an individual accessing a user interface on the client device 116 that enables a selection of different filter parameters for viewing activity information 158 that took place within the smart home 101. A more detailed description of such an interface is provided below in conjunction with FIGS. 3A-3G. As a brief aside, it is noted that in alternative scenarios, the client device 116 can receive requests to display activity information based only on at least one timespan, based on at least one timespan and at least one activity tag 156, and so on. In this regard, when the request specifies only at least one timespan, then steps 234-238 can be omitted, as the server computing device 102 can simply match the at least one timespan to the activity log entry creation timestamps 154 generated at step 218 in FIG. 2A and assigned to the activity log entries 152.

At step 232, the client device 116 provides the first request to the centralized management hub 110. At step 234, the centralized management hub 110 identifies the hash function that was used (or hash functions that were used) to generate at least one hash value based on the at least one activity tag 156 (e.g., as described above in conjunction with steps 208-210 of FIG. 2A). Such identification(s) can involve reimplementing any of the approaches described above in conjunction with steps 208-210 for managing hash functions, such as the time-based approaches, the identifier-based approaches, the activity tag-based approaches, and so on. In any case, at the conclusion of step 234, the centralized management hub 110 is in possession of the hash function(s) that can be used to produce hash values that may (or may not) match activity log entries 152 stored by the server computing device 102 (as described in greater detail below in conjunction with steps 244-246).

At step 236, the centralized management hub 110 provides the at least one activity tag 156 to the hash function to generate the at least one hash value (e.g., as described above in conjunction with step 210 of FIG. 2A). At step 238, the centralized management hub 110 identifies a user account 106 associated with the centralized management hub 110 (e.g., as described above in conjunction with step 212 of FIG. 2A). At step 240, the centralized management hub 110 generates a second request that includes (1) the user account 106 (i.e., information associated with the user account 106, such as username/password information, credentials received from the server computing device 102 in conjunction with successfully logging into the user account 106, and so on), and (2) the at least one hash value (i.e., hashed content 160 that includes hashed activity tags 156)). At step 242, the centralized management hub 110 provides the second request to the server computing device 102.

At step 244, the server computing device 102 accesses an activity log 108 associated with the user account 106. This can involve, for example, the server computing device 102 identifying a container, database, etc., that is accessible to the server computing device 102, that has been assigned to the user account 106, and that stores the activity log 108. As described herein, the container, database, etc., can also be identified based on the hashed content 160 (i.e., the hashed activity tags 156) when fine-granularity approaches are implemented (i.e., where separate containers, databases, etc., are managed for the timespans, the activity tag(s) 156, the peripheral device(s) 120, the peripheral device hub(s) 112, the centralized management hub(s) 110, the client device(s) 116, and so on). This can involve the server computing device 102 identifying two or more containers, databases, etc., in which searches for activity information 158 should be performed. Again, it is noted that the foregoing examples are not meant to be limiting, and that the server computing device 102 can be configured to manage/communicate with any number of containers, databases, etc., at any level of granularity, without departing from the scope of this disclosure.

At step 246, the server computing device 102 identifies, based on the at least one hash value (i.e., the hashed content 160 that includes the activity tags 156), activity log entries 152 within the activity log 108. As described herein, because the server computing device 102 does not have access to the hash function(s) used to generate the hashed content 160, the server computing device 102 remains oblivious to the plaintext/underlying content of the hashed content 160 (as well as the encrypted content 162 (i.e., the encrypted activity information 158)). However, the server computing device 102 can utilize the hashed content 160 to effectively look up and return any activity log entries 152 that match the hashed content 160.

At step 248, the server computing device 102 provides, to the centralized management hub 110, the encrypted activity information 158 (i.e., the encrypted content 162) included in the activity log entries 152. At step 250, the centralized management hub 110 decrypts the encrypted activity information 158 using a corresponding encryption key (i.e., the encryption key that was originally used to generate the encrypted activity information 158). At step 252, the centralized management hub 110 provides, to the client device 116, the (unencrypted) activity information 158. Finally, at step 254, the client device 116 displays the (unencrypted) activity information 158.

Accordingly, FIGS. 2A-2B illustrate sequence diagrams of the manner in which activity logs 108 can be managed to promote user privacy, according to some embodiments. A more detailed breakdown of the manner in which the entities discussed in conjunction with FIGS. 1A-1B and 2A-2B can interact to manage the activity logs 108 will now be provided below in conjunction with FIGS. 3A-3G, and 4-5.

Figure 3A:
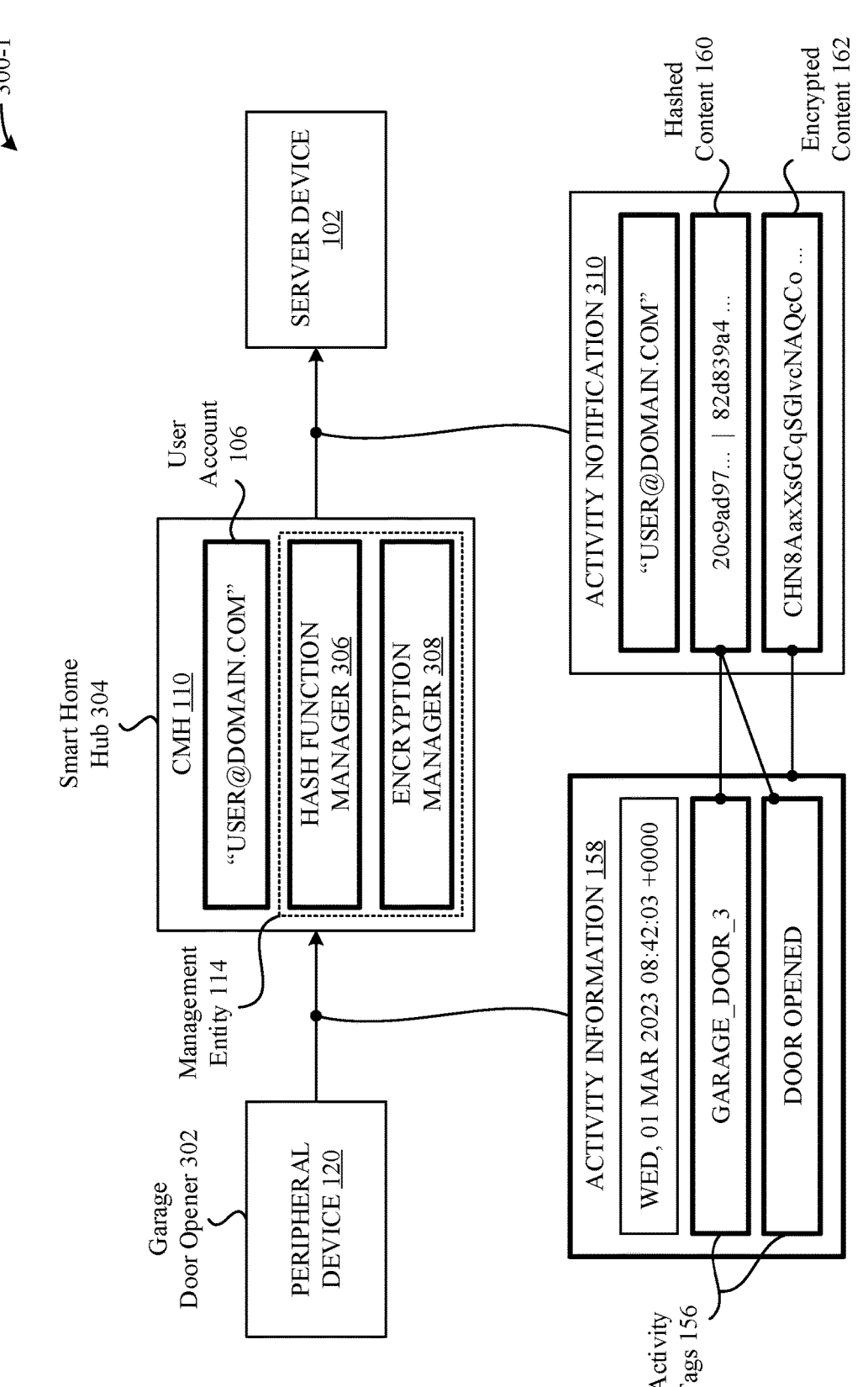
FIGS. 3A-3G illustrate conceptual diagrams of the manner in which the activity logs can be managed to promote user privacy, according to some embodiments.

FIGS. 3A-3G illustrate conceptual diagrams of the manner in which the activity logs 108 can be managed to promote user privacy, according to some embodiments. In particular, FIG. 3A illustrates a conceptual diagram 300-1 that involves a peripheral device 120 (in particular, a smart garage door opener 302), a centralized management hub 110 (in particular, a smart home hub 304), and a server computing device 102. As shown in FIG. 3A, the smart garage door opener 302 detects a garage door open event, generates activity information 158 in connection with the event, and then provides the activity information 158 to the smart home hub 304. In the example illustrated in FIG. 3A, the activity information 158 includes a timestamp of the time at which the activity took place, was detected, etc., as well as two activity tags 156: a unique identifier of the smart garage door opener 302 ("GARAGE_DOOR_3") and a description (i.e., category) of the activity that was detected ("DOOR OPENED"). The foregoing interactions are similar to those described above in conjunction with steps 202-206 of FIG. 2A.

As also shown in FIG. 3A, the smart home hub 304—in particular, the management entity 114 executing thereon—receives the activity information 158 and implements appropriate steps to generate an activity notification 310 that includes a user account 106, hashed content 160, and encrypted content 162. According to some embodiments, the management entity 114 can be associated with a user account 106 (username: "USER@DOMAIN.COM") and can implement a hash function manager 306 and an encryption manager 308. In particular, the hash function manager 306 can be configured to generate hashed content 160 based on the activity tags 156 (e.g., in accordance with the techniques described above in conjunction with steps 208-210 of FIG. 2A), and the encryption manager 308 can be configured to generate encrypted content 162 based on the activity information 158 (e.g., in accordance with the techniques described above in conjunction with steps 212-214 of FIG. 2A). In turn, the smart home hub 304 can provide the activity notification 310 to the server computing device 102 (e.g., in accordance with the techniques described above in conjunction with step 216 of FIG. 2A).

Figure 3B:
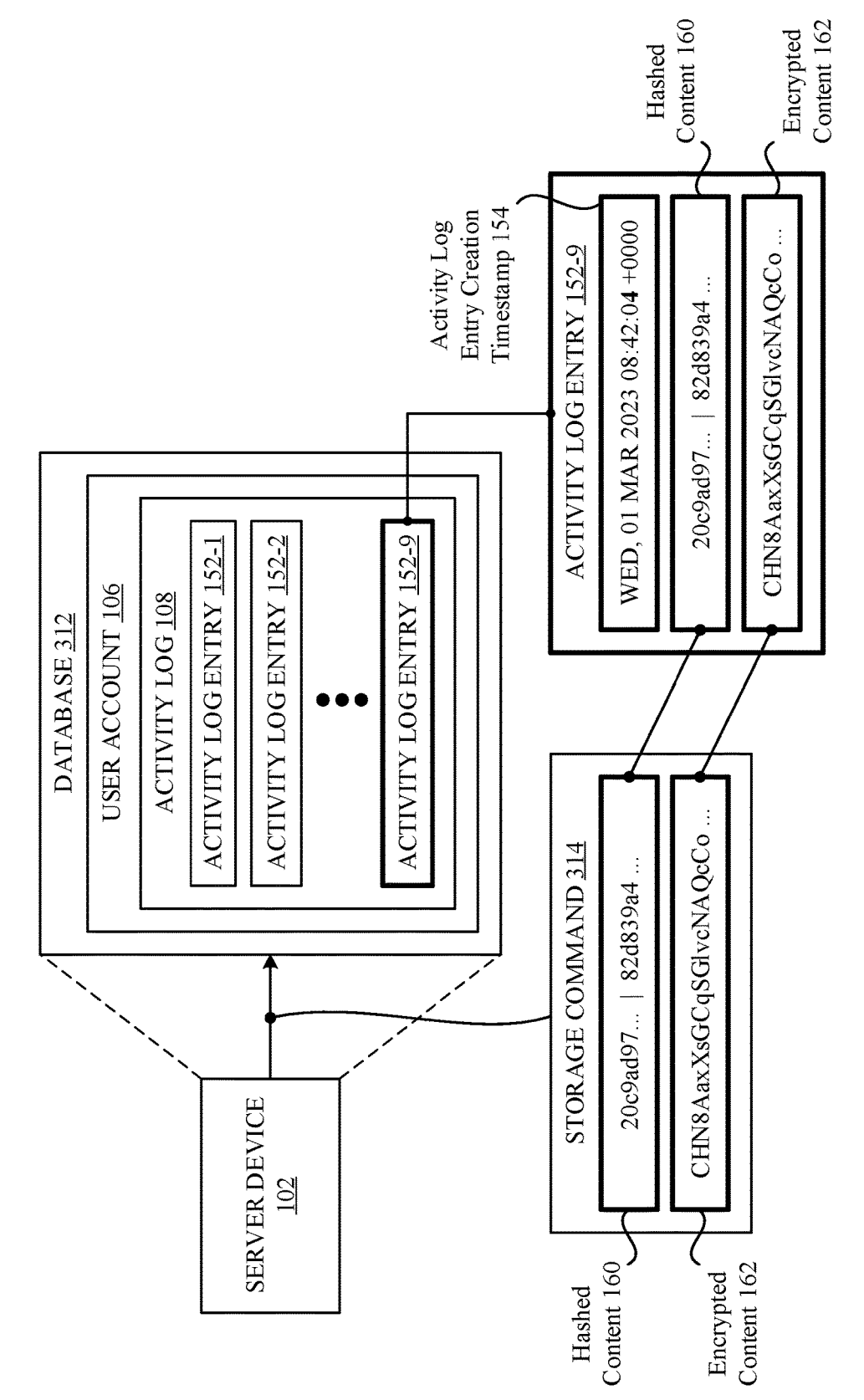

Turning now to FIG. 3B, the conceptual diagram 300-2 involves the server computing device 102 interfacing with a database 312 in response to receiving the activity notification 310. According to some embodiments, the database 312 can manage at least one activity log 108 that is associated with the user account 106, and the at least one activity log 108 can be identified based on the user account 106 information that is included in the activity notification 310. As shown in FIG. 3B, the server computing device 102 can generate a storage command 314 that includes the hashed content 160 and the encrypted content 162 included in the activity notification 310. In turn, the database 312 can generate an activity log entry 152 that includes an activity log entry creation timestamp 154, the hashed content 160, and the encrypted content 162. The foregoing interactions are similar to those described above in conjunction with steps 218-220 of FIG. 2A.

Figure 3C:
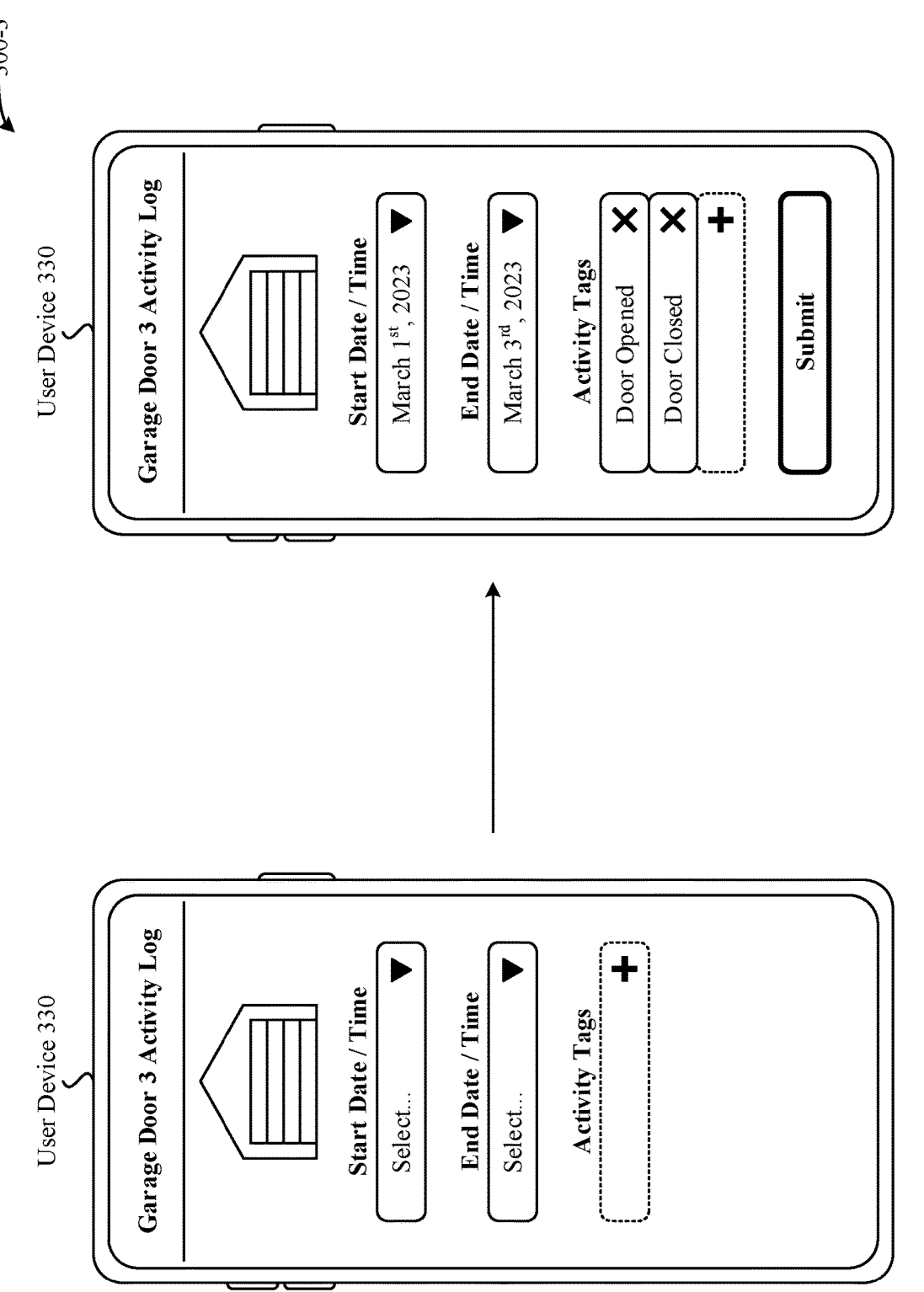

Turning now to FIG. 3C, the conceptual diagram 300-3 depicts an example implementation of a peripheral device activity UI 118 that can be displayed on a user device 330 (e.g., a client device 116). As shown in FIG. 3C, the peripheral device activity UI 118 provides an ability for a user of the user device 330 to retrieve activity information 158 that corresponds to a timespan and/or one or more activity tags 156 associated with the smart home hub 304. As shown in FIG. 3C, the user specifies a timespan ranging from Mar. 1, 2023, to Mar. 3, 2023, and also specifies the activity tags 156 related to garage door open events and garage door close events. In turn, the user submits the search query. It is noted that the peripheral device activity UI 118 is not limited to single peripheral devices 120, single timespans, and so on. On the contrary, the peripheral device activity UI 118 can enable a user to specify any number of devices, timespans, activity tags, etc., to be used to look up activity information 158, without departing from the scope of this disclosure. The foregoing interactions are similar to those described above in conjunction with step 230 of FIG. 2B.

Figure 3D:
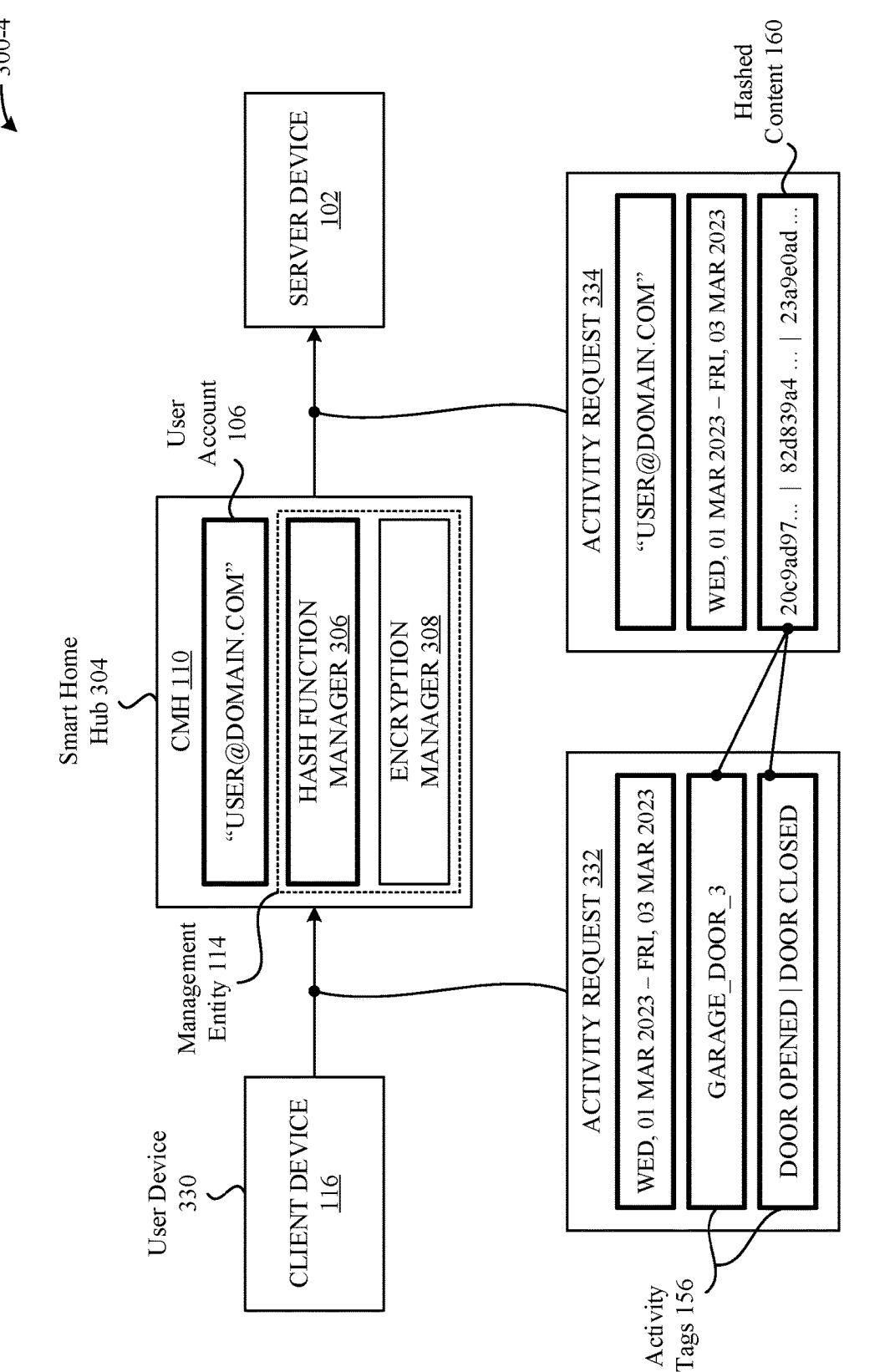

Turning now to FIG. 3D, the conceptual diagram 300-4 involves the user device 330 generating an activity request 332 that includes the timespan and the activity tags 156 provided by the user in conjunction with FIG. 3C. As shown in FIG. 3D, the user device 330 can automatically add the unique identifier of the smart garage door opener 302 ("GARAGE_DOOR_3") to the activity tags 156, given that peripheral device activity UI 118 was narrowed to viewing activity information 158 associated with the smart garage door opener 302. In any case, the smart home hub 304, upon receiving the activity request 332, can utilize the hash function manager 306 to identify the hash function(s) previously used to generate hashed content 160 for the activity information 158 that corresponds to the activity request 332. The hash function manager 306 can then provide the activity tags 156 to the identified hash function(s) to generate hashed content 160. In turn, the hash function manager 306 generates an activity request 334 that includes the user account 106 (i.e., "USER@DOMAIN.COM")—as well as the timespan/activity tags 156 gathered in conjunction with FIG. 3C—and provides the activity request 334 to the server computing device 102. The foregoing interactions are similar to those described above in conjunction with steps 232-242 of FIG. 2B.

Figure 3E:
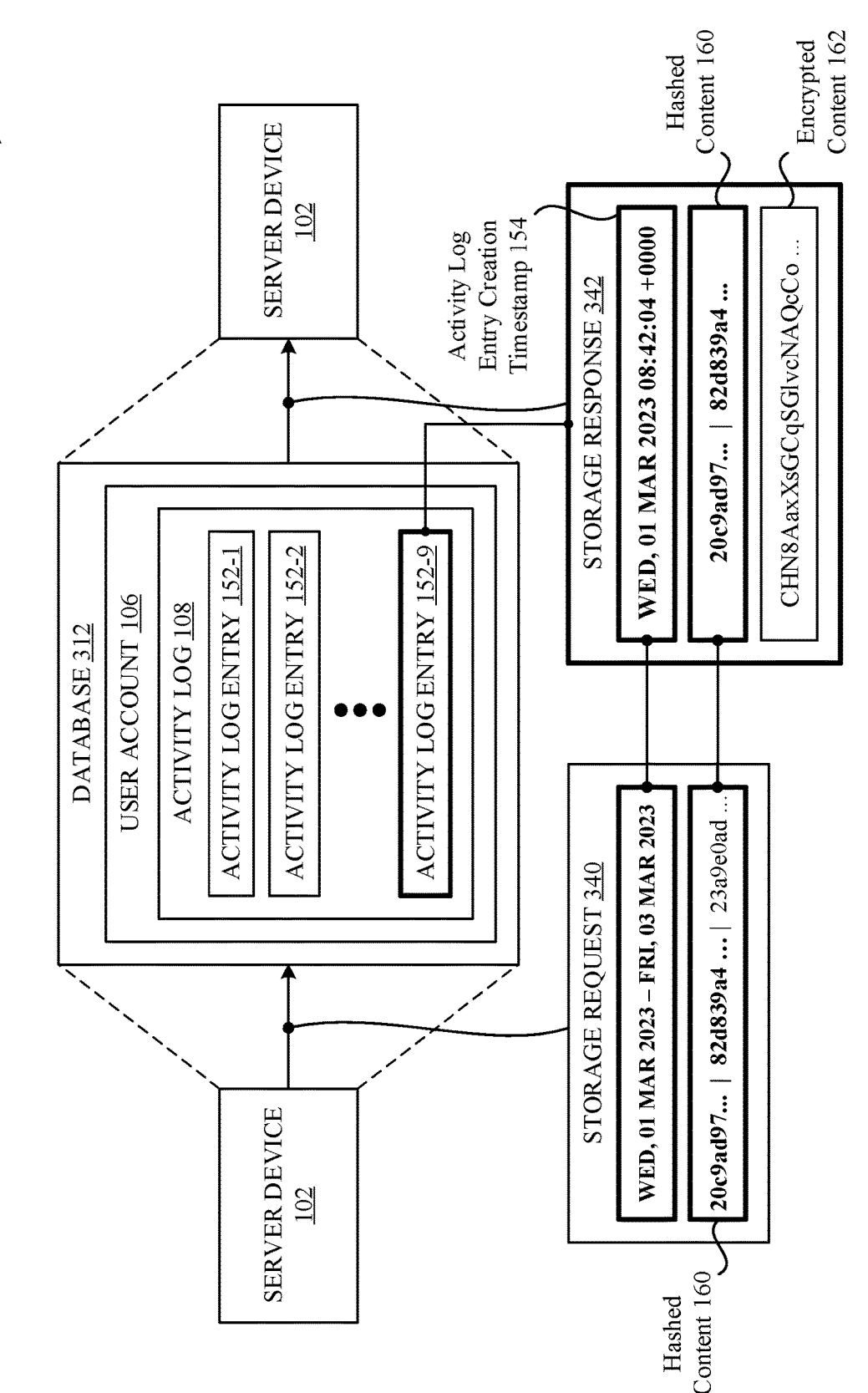

Turning now to FIG. 3E, the conceptual diagram 300-5 involves the server computing device 102 generating a storage request 340 and providing the storage request 340 to the database 312. As described herein, the server computing device 102/database 312 can identify the appropriate activity log 108 based on the user account 106 (or other) information included in the activity request 334. In turn, the database 312 can identify activity log entries 152, if any, that correspond to the timestamp/hashed content 160 (i.e., the hashed activity tags 156 included therein). As shown in FIG. 3E, the database 312 identifies at least one activity log entry 152—specifically, the activity log entry 152-9 that was created in conjunction with FIGS. 3A-3B—and generates a storage response 342 that includes at least some of the information stored in the activity log entry 152-9. Such information can include, for example, the activity log entry creation timestamp 154, the hashed content 160, and the encrypted content 162. Alternatively, the information can include only the encrypted content 162, as the activity log entry creation timestamp 154/hashed content 160 may be redundant/irrelevant. The storage response 342 can then be provided by the database 312 to the server computing device 102. The foregoing interactions are similar to those described above in conjunction with steps 244-246 of FIG. 2B.

Figure 3F:
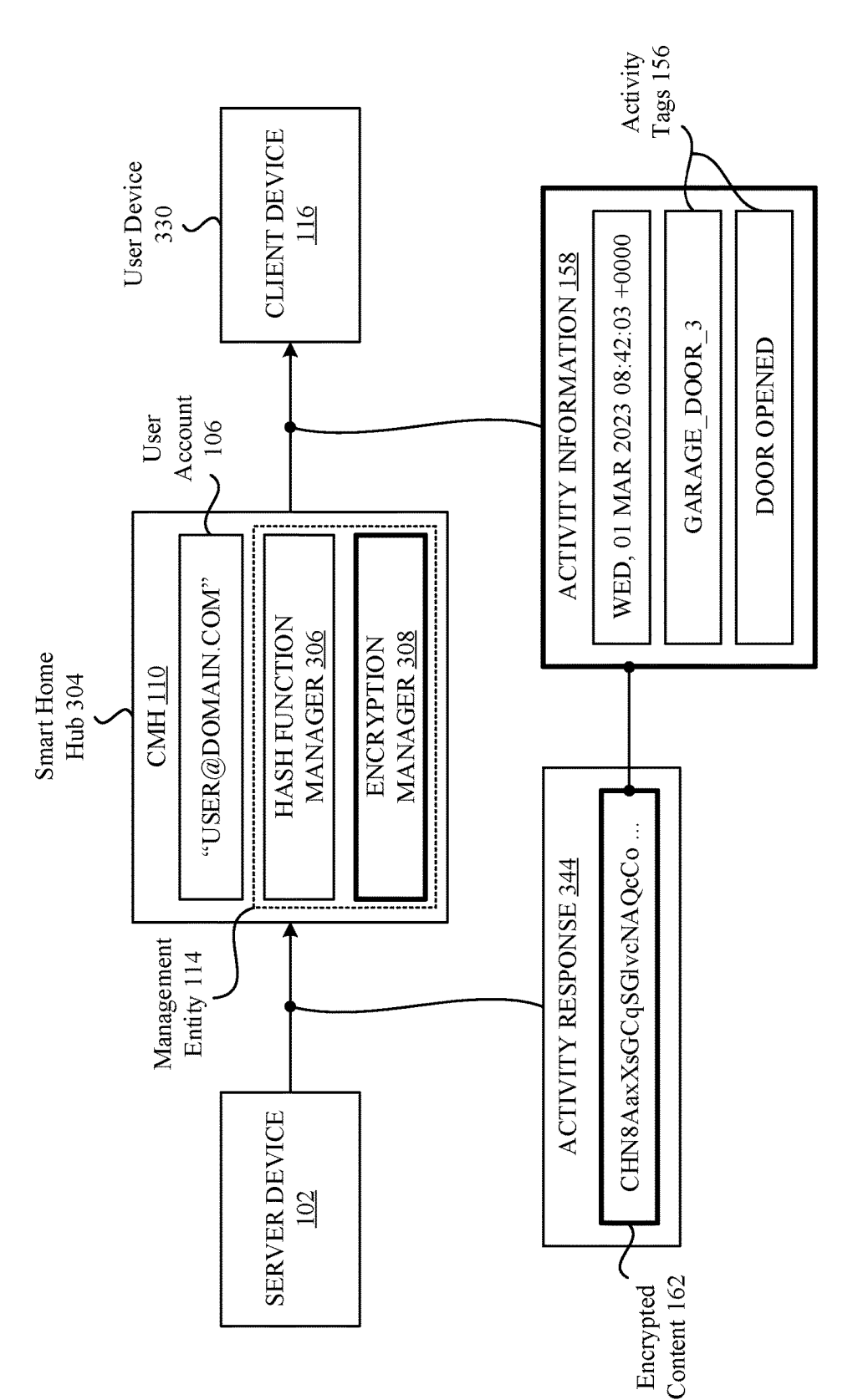
Figure 3G:
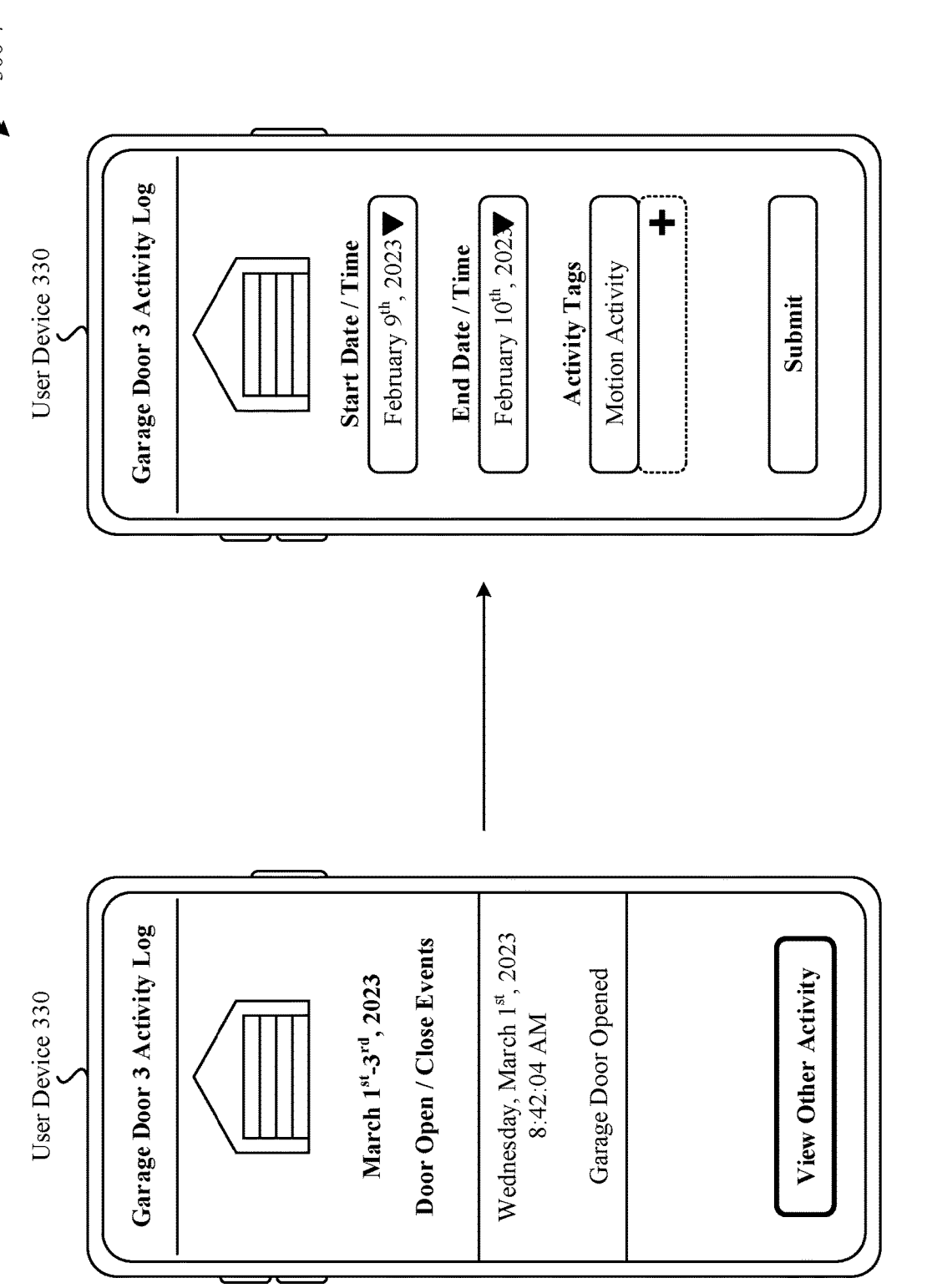

Turning now to FIG. 3F, the conceptual diagram 300-6 involves the server computing device 102 generating an activity response 344 that includes the encrypted content 162. The server computing device 102 then provides the activity response 344 to the smart home hub 304. In turn, the encryption manager 308 of the smart home hub 304 identifies an encryption key capable of decrypting the encrypted content 162, i.e., the encryption key that was originally used to generate the encrypted content 162 based on the activity information 158. The smart home hub 304 can then decrypt and provide the activity information 158 to the user device

330. In turn, and as shown in the conceptual diagram 300-7 of FIG. 3G, the peripheral device activity UI 118 can be updated to display content based on the activity information 158. The user can then optionally search for other activity information 158 based on other search parameters.

Accordingly, FIGS. 3A-3G illustrate conceptual diagrams of the manner in which activity logs 108 can be managed to promote user privacy, according to some embodiments. High-level breakdowns of the manners in which the entities discussed in conjunction with FIGS. 1A-1B, 2A-2B, and 3A-3G can interact to manage the activity logs 108 will now be provided below in conjunction with FIGS. 4-5.

FIG. 4 illustrates a method 400 for storing activity logs in a manner that promotes user privacy, according to some embodiments. As shown in FIG. 4, the method 400 begins at step 402, where a centralized management hub (e.g., the centralized management hub 110 of FIG. 1A) receives, from a peripheral device, information about activity detected by the peripheral device, where the information includes at least one activity tag (e.g., as described above in conjunction with steps 202-206 of FIG. 2A). At step 404, the centralized management hub identifies a hash function (e.g., as described above in conjunction with step 208 of FIG. 2A). At step 406, the centralized management hub provides the at least one activity tag to the hash function to generate a hash value (e.g., as described above in conjunction with step 210 of FIG. 2A).

At step 408, the centralized management hub 110 encrypts, using an encryption key that is accessible to the centralized management hub, at least a subset of the information to produce encrypted information (e.g., as described above in conjunction with steps 212-214 of FIG. 2A). At step 410, the centralized management hub 110 causes a server device to store, in an activity log associated with the centralized management hub, an activity log entry that includes: a timestamp corresponding to a time at which the activity log entry is stored, the hash value, and the encrypted information (e.g., as described above in conjunction with steps 216-220 of FIG. 2A).

FIG. 5 illustrates a method 500 for recalling activity logs in a manner that promotes user privacy, according to some embodiments. As shown in FIG. 5, the method 500 begins at step 502, where the centralized management hub receives, from a peripheral device, a first request to obtain at least one activity log entry from an activity log, where the first request includes a timespan and at least one activity tag (e.g., as described above in conjunction with steps 230-232 of FIG. 2B). At step 504, the centralized management hub identifies a hash function that was used to generate at least one hash value based on the at least one activity tag (e.g., as described above in conjunction with step 234 of FIG. 2B). At step 506, the centralized management hub provides the at least one activity tag to the hash function to generate at least one hash value (e.g., as described above in conjunction with step 236 of FIG. 2B).

At step 508, the centralized management hub issues, to a server device, a second request to obtain at least one encrypted activity log entry based on the timespan and the at least one hash value (e.g., as described above in conjunction with steps 238-242 of FIG. 2B). At step 510, the centralized management hub receives the at least one encrypted log entry from the server device (e.g., as described above in conjunction with steps 244-248 of FIG. 2B). At step 512, the centralized management hub decrypts the at least one encrypted log entry using an encryption key to produce at least one decrypted log entry (e.g., as described above in conjunction with step 250 of FIG. 2B). At step 514, the centralized management hub causes the peripheral device to display content derived from the at least one decrypted log entry (e.g., as described above in conjunction with steps 252-254 of FIG. 2B).

FIG. 6 illustrates a detailed view of a computing device 600 that can be used to implement the various components described herein, according to some embodiments. In particular, the detailed view illustrates various components that can be included in the server computing devices 102, the centralized management hubs 110, the peripheral device hubs 112, the client devices 116, and the peripheral devices 120 described above in conjunction with FIG. 1A.

As shown in FIG. 6, the computing device 600 can include a processor 602 that represents a microprocessor or controller for controlling the overall operation of computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, etc. Furthermore, the computing device 600 can include a display 610 (screen display) that can be controlled by the processor 602 to display information to the user. A data bus 616 can facilitate data transfer between at least a storage device 640, the processor 602, and a controller 613. The controller 613 can be used to interface with and control different equipment through and equipment control bus 614. The computing device 600 can also include a network/bus interface 611 that couples to a data link 612. In the case of a wireless connection, the network/bus interface 611 can include a wireless transceiver.

The computing device 600 also includes a storage device 640, which can comprise a single disk or a plurality of disks (e.g., SSDs), and includes a storage management module that manages one or more partitions within the storage device 640. In some embodiments, storage device 640 can include flash memory, semiconductor (solid state) memory or the like. The computing device 600 can also include a Random-Access Memory (RAM) 620 and a Read-Only Memory (ROM) 622. The ROM 622 can store programs, utilities, or processes to be executed in a non-volatile manner. The RAM 620 can provide volatile data storage, and stores instructions related to the operation of the computing devices described herein.

The various aspects, embodiments, implementations, or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data that can be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

As described herein, one aspect of the present technology is the gathering and use of data available from various sources to improve user experiences. The present disclosure contemplates that in some instances, this gathered data may include personal information data that uniquely identifies or can be used to contact or locate a specific person. Such personal information data can include demographics data, location-based data, telephone numbers, email addresses, home addresses, data or records relating to a user's health or level of fitness (e.g., vital signs measurements, medication information, exercise information), date of birth, smart home activity, or any other identifying or personal information. The present disclosure recognizes that the use of such personal information data, in the present technology, can be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select to provide only certain types of data that contribute to the techniques described herein. In addition to providing "opt in" and "opt out" options, the present disclosure contemplates providing notifications relating to the access or use of personal information. For instance, a user may be notified that their personal information data may be accessed and then reminded again just before personal information data is accessed.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A method for managing activity logs in a manner that promotes user privacy, the method comprising, at a centralized management hub:
   receiving, from a peripheral device, information about activity detected by the peripheral device, wherein the information includes activity information and an activity tag separate from the activity information;
   identifying a hash function;
   providing the activity tag to the hash function to generate a hashed activity tag;
   encrypting, using an encryption key that is accessible to the centralized management hub, at least a subset of the information to produce encrypted information; and
   causing a server device to store, in an activity log associated with the centralized management hub, an activity log entry that includes:
      a timestamp corresponding to a time at which the activity log entry is stored,
      the hashed activity tag, and
      the encrypted information.

2. The method of claim 1, wherein the activity tag is based on one or more of the activity or the peripheral device.

3. The method of claim 1, wherein:
   the hash function corresponds to a timespan, and
   a second time at which the hash function is identified falls within the timespan.

4. The method of claim 1, wherein the hash function corresponds to one or more of the activity or the peripheral device.

5. The method of claim 1, wherein:
   the encryption key comprises a public key that is accessible to the centralized management hub, and
   a private key that is a counterpart to the public key is accessible to the centralized management hub but inaccessible to the server device.

6. The method of claim 1, wherein the information further includes one or more of:
   a second timestamp correspond to a second time at which the activity is detected by the peripheral device,
   a unique identifier associated with the peripheral device, or
   a description of the activity.

7. The method of claim 1, wherein a user account is associated with both the activity log and the centralized management hub.

8. A non-transitory computer readable storage medium configured to store instructions that, when executed by a processor included in a centralized management hub, cause the centralized management hub to manage activity logs in a manner that promotes user privacy, by carrying out steps that include:
   receiving, from a peripheral device, information about activity detected by the peripheral device, wherein the information includes activity information and an activity tag separate from the activity information;
   identifying a hash function;
   providing the activity tag to the hash function to generate a hashed activity tag;
   encrypting, using an encryption key that is accessible to the centralized management hub, at least a subset of the information to produce encrypted information; and
   causing a server device to store, in an activity log associated with the centralized management hub, an activity log entry that includes:
      a timestamp corresponding to a time at which the activity log entry is stored,
      the hashed activity tag, and
      the encrypted information.

9. The non-transitory computer readable storage medium of claim 8, wherein the activity tag is based on one or more of the activity or the peripheral device.

10. The non-transitory computer readable storage medium of claim 8, wherein:
   the hash function corresponds to a timespan, and
   a second time at which the hash function is identified falls within the timespan.

11. The non-transitory computer readable storage medium of claim 8, wherein the hash function corresponds to one or more of the activity or the peripheral device.

12. The non-transitory computer readable storage medium of claim 8, wherein:
   the encryption key comprises a public key that is accessible to the centralized management hub, and
   a private key that is a counterpart to the public key is accessible to the centralized management hub but inaccessible to the server device.

13. The non-transitory computer readable storage medium of claim 8, wherein the information further includes one or more of:
   a second timestamp correspond to a second time at which the activity is detected by the peripheral device,
   a unique identifier associated with the peripheral device, or
   a description of the activity.

14. The non-transitory computer readable storage medium of claim 8, wherein a user account is associated with both the activity log and the centralized management hub.

15. The method of claim 1, wherein the activity tag is a first activity tag, wherein the information includes a second activity tag separate from the first activity tag, the method further comprising:
   generating a second hashed activity tag for the second activity tag, wherein the second hashed activity tag is separate from the first hashed activity tag, and wherein the activity log entry includes the second hashed activity tag.

16. The non-transitory computer readable storage medium of claim 8, wherein the activity tag is a first activity tag, wherein the information includes a second activity tag separate from the first activity tag, wherein the steps further include:

generating a second hashed activity tag for the second activity tag, wherein the second hashed activity tag is separate from the first hashed activity tag, and wherein the activity log entry includes the second hashed activity tag.

17. A centralized management hub, comprising:

one or more processors; and a computer readable medium including one or more instructions that, when executed by the one or more processors, causes the one or more processors to perform operations comprising:

receiving, from a peripheral device, information about activity detected by the peripheral device, wherein the information includes activity information and an activity tag separate from the activity information;

identifying a hash function;

providing the activity tag to the hash function to generate a hashed activity tag;

encrypting, using an encryption key that is accessible to the centralized management hub, at least a subset of the information to produce encrypted information; and causing a server device to store, in an activity log associated with the centralized management hub, an activity log entry that includes:

a timestamp corresponding to a time at which the activity log entry is stored, the hashed activity tag, and the encrypted information.

18. The centralized management hub of claim 17, wherein the activity tag is based on one or more of the activity or the peripheral device.

19. The centralized management hub of claim 17, wherein:

the hash function corresponds to a timespan, and a second time at which the hash function is identified falls within the timespan.

20. The centralized management hub of claim 17, wherein the hash function corresponds to one or more of the activity or the peripheral device.

21. The centralized management hub of claim 17, wherein:

the encryption key comprises a public key that is accessible to the centralized management hub, and a private key that is a counterpart to the public key is accessible to the centralized management hub but inaccessible to the server device.

22. The centralized management hub of claim 17, wherein the information further includes one or more of:

a second timestamp correspond to a second time at which the activity is detected by the peripheral device, a unique identifier associated with the peripheral device, or a description of the activity.

23. The centralized management hub of claim 17, wherein a user account is associated with both the activity log and the centralized management hub.

24. The centralized management hub of claim 17, wherein the activitytag is a first activity tag, wherein the information includes a second activity tag separate from the first activity tag, wherein the one or more instructions that, when executed by the one or more processors, causes the one or more processors to perform operations comprising:

generating a second hashed activity tag for the second activity tag, wherein the second hashed activity tag is separate from the first hashed activity tag, and wherein the activity log entry includes the second hashed activity tag.

* * * * *